US012679010B2

(12) United States Patent
Sato et al.

(10) Patent No.: US 12,679,010 B2
(45) Date of Patent: Jul. 14, 2026

(54) ALUMINUM MEMBER, ALUMINUM-RESIN COMPOSITE, AND METHOD FOR PRODUCING THE ALUMINUM-RESIN COMPOSITE

(71) Applicants: Prime Planet Energy & Solutions, Inc., Tokyo (JP); TOYOTA JIDOSHA KABUSHIKI KAISHA, Aichi-ken (JP); PRIMEARTH EV ENERGY CO., LTD., Shizuoka-ken (JP)

(72) Inventors: Yuki Sato, Toyota (JP); Yozo Uchida, Toyota (JP); Tsuyoshi Ehara, Toyota (JP); Syoichi Tsuchiya, Toyota (JP); Masataka Asai, Toyota (JP); Tsuyoshi Asano, Toyota (JP); Masahiro Uchimura, Miyoshi (JP); Yasuaki Nagano, Kosai (JP); Shigeru Matsumoto, Toyohashi (JP)

(73) Assignees: PRIME PLANET ENERGY & SOLUTIONS, INC., Tokyo (JP); TOYOTA JIDOSHA KABUSHIKI KAISHA, Aichi-Ken (JP); TOYOTA BATTERY CO., LTD., Shizuoka (JP)

( * ) Notice: Subject to any disclaimer, the term of this patent is extended or adjusted under 35 U.S.C. 154(b) by 241 days.

(21) Appl. No.: 18/593,982

(22) Filed: Mar. 4, 2024

(65) Prior Publication Data

US 2024/0335987 A1 Oct. 10, 2024

(30) Foreign Application Priority Data

Apr. 10, 2023 (JP) ................................ 2023-063640

(51) Int. Cl.
B29C 45/14 (2006.01)
B23K 26/342 (2014.01)
(Continued)

(52) U.S. Cl.
CPC ...... B29C 45/14311 (2013.01); B23K 26/342 (2015.10); B32B 15/08 (2013.01);
(Continued)

(58) Field of Classification Search
None
See application file for complete search history.

(56) References Cited

U.S. PATENT DOCUMENTS

2015/0224742 A1 8/2015 Inoue et al.
2017/0320247 A1* 11/2017 Aizawa ............ H01L 23/49548
(Continued)

FOREIGN PATENT DOCUMENTS

JP 2010-137315 A 6/2010
JP 5714193 B1 5/2015
(Continued)

OTHER PUBLICATIONS

Demir—laser texturing for surface functionalization—joint strength13 some sub-micron—2013 (Year: 2013).*
(Continued)

*Primary Examiner* — John Vincent Lawler
(74) *Attorney, Agent, or Firm* — HAUPTMAN HAM, LLP

(57) ABSTRACT

In an aluminum member, a member body made of metal aluminum (a lid member and a positive terminal member) is formed, on its member surface, with protrusions (a lid upper-surface protrusion layer, a lid lower-surface protrusion layer, a terminal side-surface protrusion layer, a terminal lower-surface protrusion layer) having a nano-order diameter of less than 1 μm and a nano-order height of less than 1 μm, which are densely arranged. Proximal end portions of the protrusions, continuous to the member surface, contains amorphous alumina and α-alumina.

4 Claims, 14 Drawing Sheets

(51) Int. Cl.

| | | |
|---|---|---|
| *B23K 103/10* | (2006.01) | |
| *B29K 705/02* | (2006.01) | |
| *B32B 15/08* | (2006.01) | |
| *B32B 15/20* | (2006.01) | |
| *H01M 50/119* | (2021.01) | |
| *H01M 50/121* | (2021.01) | |
| *H01M 50/124* | (2021.01) | |

(52) U.S. Cl.

CPC .......... *B32B 15/20* (2013.01); *B23K 2103/10* (2018.08); *B29C 2045/14868* (2013.01); *B29K 2705/02* (2013.01); *H01M 50/119* (2021.01); *H01M 50/121* (2021.01); *H01M 50/124* (2021.01); *H01M 2220/20* (2013.01)

(56) References Cited

U.S. PATENT DOCUMENTS

| | | | |
|---|---|---|---|
| 2019/0001441 A1* | 1/2019 | Gu | ........................ B29C 66/919 |
| 2020/0070477 A1* | 3/2020 | Sai | ........................ B32B 27/286 |

FOREIGN PATENT DOCUMENTS

| | | |
|---|---|---|
| JP | 2018-164989 A | 10/2018 |
| JP | 2022057584 A | 4/2022 |
| WO | 2019/097624 A1 | 5/2019 |

OTHER PUBLICATIONS

Heckert—lasering aluminum for joining plastics—EuroSearch D5—Phys. Proc.—2014 (Year: 2014).*
Jing—surface mod laser texturing Al2O3—2021 (Year: 2021).*

* cited by examiner

EELS spectrum obtained from cross-section specimen

Spectrum obtained from Al substrate
Spectrum obtained from nanostructure

Similar

EELS spectrum obtained from analysis company

ENERGY (eV)

ENERGY (eV)

Results of Acid resistance test

| Type of aluminum member / Immersion time | Unirradiated aluminum member | Irradiated aluminum member |
|---|---|---|
| 1 hour | Not separated | Not separated |
| 5 hours | Not separated | Not separated |
| 24 hours | Separated | Not separated |

FIG. 14B

Results of Hydrofluoric acid resistance test

| Type of aluminum member / Immersion time | Unirradiated aluminum member | Irradiated aluminum member |
|---|---|---|
| 1 hour | Not separated | Not separated |
| 5 hours | Not separated | Not separated |
| 24 hours | Separated | Not separated |

ALUMINUM MEMBER, ALUMINUM-RESIN COMPOSITE, AND METHOD FOR PRODUCING THE ALUMINUM-RESIN COMPOSITE

CROSS-REFERENCE TO RELATED APPLICATIONS

This application is based upon and claims the benefit of priority to Japanese Patent Application No. 2023-063640 filed on Apr. 10, 2023, the entire contents of which are incorporated herein by reference.

BACKGROUND

Technical Field

The disclosure relates to an aluminum member, an aluminum-resin composite, and a method of producing the aluminum-resin composite.

Related Art

An aluminum-resin composite in which an aluminum member and a resin member are joined together has been known. To enhance the joining strength between the aluminum member and the resin member, the surface of the aluminum member has been subjected to a roughening treatment in advance. A related art to this technique is disclosed in for example Japanese unexamined patent application publication No. 2018-164989A (JP 2018-164989A).

In JP 2018-164989A, in order to obtain an aluminum-resin composite, the surface of an aluminum member is first roughened by immersing the aluminum member in an etching agent. By this roughening treatment, the surface of the aluminum member is formed with fine asperities.

SUMMARY

Technical Problems

Meanwhile, when the conventional aluminum-resin composite is immersed in an electrolyte solution prepared by adding water to a non-aqueous electrolyte containing lithium hexafluorophosphate, the resin member may be separated, or peeled, from the aluminum member. The reasons thereof will be described below. Generally, the surface of an aluminum member has a very thin oxide film formed thereon. Thus, in an aluminum-resin composite, a resin member is joined to an aluminum member via this oxide film. In the above-mentioned solution, hydrogen fluoride occurs. Therefore, when the aluminum-resin composite is immersed in the above-mentioned solution, the oxide film is decomposed by the hydrogen fluoride in the solution. This results in separation of the resin member from the aluminum member. Further, when the aluminum-resin composite is immersed in a solution of hydrochloric acid, similarly, the oxide film is decomposed by the hydrogen chloride in the solution and thus the resin member is separated from the aluminum member.

As described above, the conventional aluminum-resin composite is also considered to be not high in acid resistance and hydrofluoric acid resistance. In other words, the joining strength of the joined portions of the aluminum member and the resin member joined together is not sufficient. It therefore has been desired to further enhance the joining strength of the joined portions.

The disclosure has been made to address the above problems and has a purpose to provide an aluminum member with excellent joining strength of the joined portions of the aluminum member and a resin member joined together, an aluminum-resin composite, and a method of producing the aluminum-resin composite.

Means of Solving the Problems

To achieve the above-mentioned purpose, one aspect of the present disclosure provides an aluminum member made of metal aluminum, having a member surface on which protrusions are densely arranged, the protrusions each having a nano-order diameter of less than 1 μm and a nano-order height of less than 1 μm, and the protrusions each including a proximal end portion continuous to the member surface, the proximal end portion containing amorphous alumina and α-alumina.

According to the aluminum member of the disclosure, on the member surface, the protrusions with the nano-order diameter and the nano-order height, each having less than 1 μm, are arranged densely. Thus, the anchoring effect enhances the joining strength of joined portions of the aluminum member and a resin member joined together. Furthermore, the proximal end portions, i.e., bottom portions, of the protrusions, continuous to the member surface, contain not only amorphous alumina but also α-alumina exhibiting excellent chemical stability. This improves the acid resistance and the hydrofluoric acid resistance of the joined portions, and hence the difficulty of separation of the resin member when immersed in the solution prepared by adding water in the non-aqueous electrolyte containing hydrochloric acid or lithium hexafluorophosphate.

According to another aspect, the disclosure provides an aluminum-resin composite composed of the aluminum member described above and a resin member joined to the aluminum member.

According to still another aspect, the disclosure provides a method of producing an aluminum-resin composite described above, the method comprising: forming the protrusions on the member surface by laser irradiation to the member surface to be formed with protrusions; and after forming the protrusions, forming the resin member on the member surface by insert molding.

BRIEF DESCRIPTION OF THE DRAWINGS

FIG. 7A is an explanatory view showing a joining region of a side surface of a part of the positive terminal member, joined to the positive-electrode resin member, and a roughened region on the side surface of the part of the positive terminal member;

FIG. 7B is an explanatory view showing a joining region of a lower surface of a long straight portion of the positive terminal member, joined to the positive-electrode resin member, and a roughened region on the lower surface of the long straight portion of the positive terminal member;

FIG. 13 is a schematic diagram showing an insert-molding process;

FIG. 14A is a table showing results of an acid resistance test; and

FIG. 14B is a table showing results of a hydrofluoric acid resistance test.

DETAILED DESCRIPTION OF THE EXEMPLARY EMBODIMENTS

A detailed description of an embodiment of this disclosure will now be given referring to the accompanying drawings. A battery 1 constituting an aluminum-resin composite, which is a combined body of aluminum and resin components, is a rectangular, sealed lithium-ion secondary battery to be mounted in vehicles, such as hybrid cars, plug-in hybrid cars, and electric cars. In the following description, the reference signs X, Y, and Z in figures represent specific directions, that is, a right-left direction, a front-back direction, and an upper-lower direction, respectively. For each direction indicated by a double-headed arrow, the reference signs U, D, L, R, F, and B represent specific positions, i.e., an upper side, a lower side, a left side, a right side, a front side, and a back side, respectively. However, those directions and positions are merely identified for convenience of explanation and do not limit the orientation of the battery 1 to be installed.

Configuration of Battery

Figure 1:
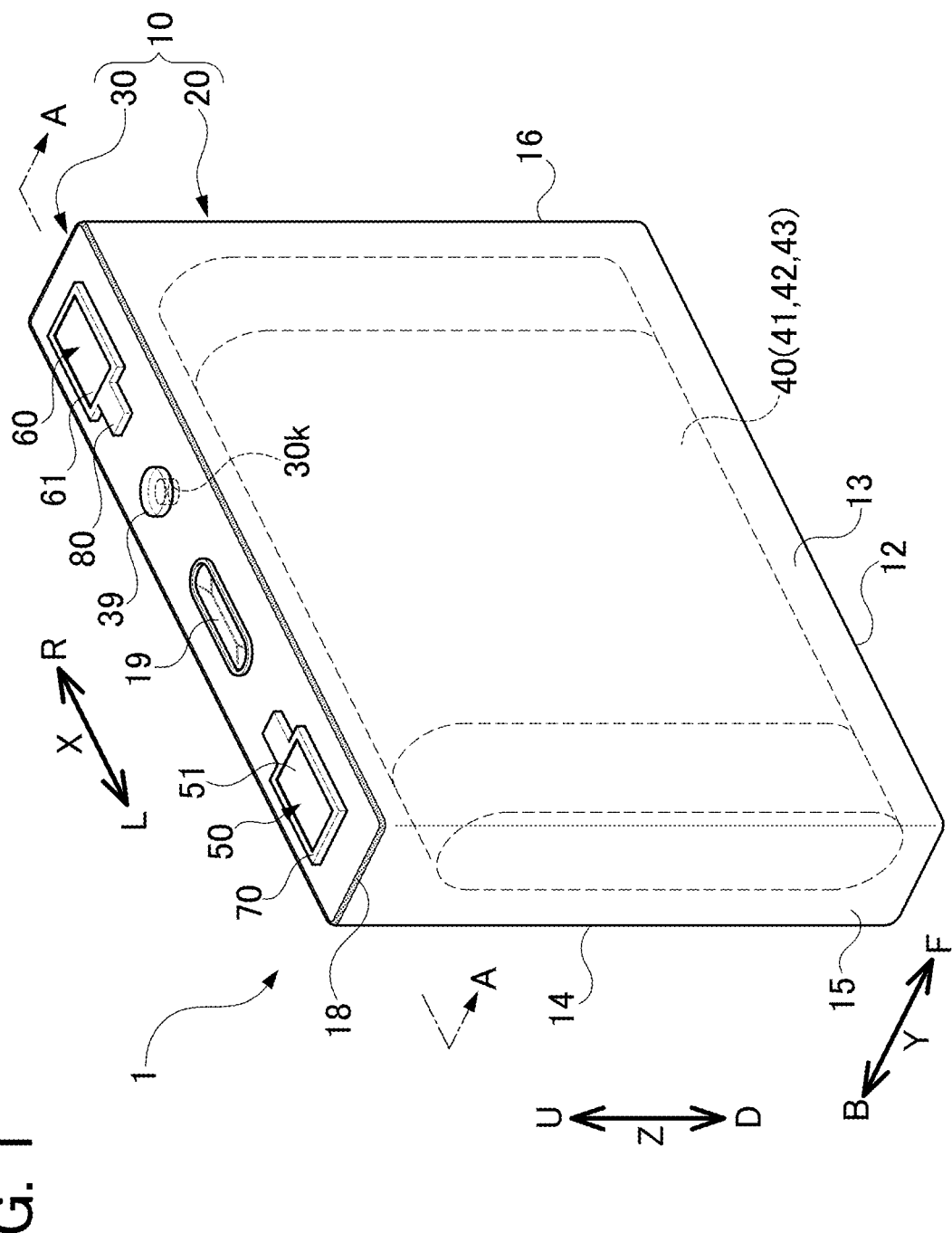
FIG. 1 is a perspective view of a battery in an embodiment.
Figure 2:
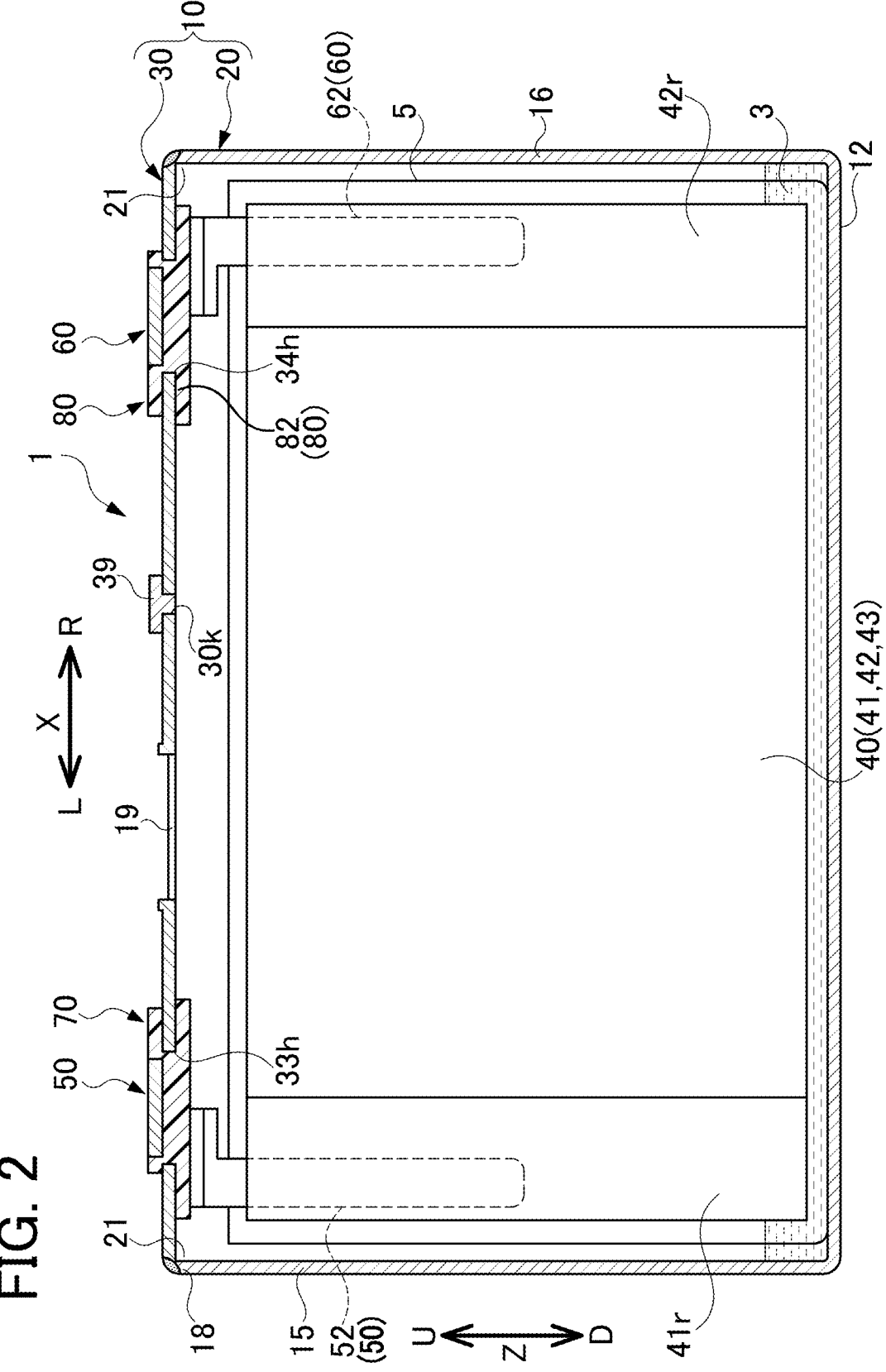
FIG. 2 is a cross-sectional view of the battery cut along a line A-A in FIG. 1.

FIG. 1 is a perspective view of the battery 1. FIG. 2 is a cross-sectional view of this battery 1 cut along a line A-A in FIG. 1. As shown in FIGS. 1 and 2, the battery 1 includes a case 10 with a sealed interior, an electrode body 40, an electrolyte 3, and an insulating holder 5, which are housed in the case 10, and further a positive terminal member 50 and a negative terminal member 60 each connected to the electrode body 40.

The case 10 has an overall flat and bottomed rectangular parallelepiped shape. This case 10 is composed of a case body 20 and a lid member 30. In this embodiment, the case 10 is made of aluminum. The material of the case 10 may be an aluminum-based metal other than aluminum, such as aluminum alloy. Alternatively, the material of the case 10 may be metal other than the aluminum-based metal, such as iron-based metal. The lid member 30, the positive terminal member 50, and the negative terminal member 60 are one example of an aluminum member of the disclosure.

The case body 20 has a bottomed rectangular tube, or box, shape with an opening 21. In other words, the case body 20 includes a rectangular plate-shaped bottom 12, a pair of front side part 13 and back side part 14, extending vertically from the long edges of the bottom 12 on the front side F and the back side B respectively, and a pair of left side part 15 and right side part 16, extending vertically from the short edges of the bottom 12 on the left side L and the right side R. The opening 21 has a rectangular shape with a long side direction corresponding to the right-left direction X and a short side direction corresponding to the front-back direction Y. The bottom 12 has a rectangular plate shape with a long side direction corresponding to the right-left direction X and a short side direction corresponding to extending in the front-back direction Y. Each of the front side part 13 and the back side part 14 has a rectangular plate shape with a long side direction corresponding to the right-left direction X and a short side direction corresponding to the upper-lower direction Z. Each of the left side part 15 and the right side part 16 has a rectangular plate shape with a long side direction corresponding to the upper-lower direction Z and a short side corresponding to the front-back direction Y.

The height of each of the front side part 13 and the back side part 14, i.e., the length thereof in the upper-lower direction Z, is equal to the height of each of the left side part 15 and the right side part 16. The height of the front side part 13 and the back side part 14 (i.e., the length thereof in the upper-lower direction Z) and the length of the front side part 13 and the back side part 14 in the right-left direction X are relatively longer than the length of the left side part 15 and the right side part 16 in the front-back direction Y. Therefore, in the following description, the right-left direction X, the front-back direction Y, and the upper-lower direction Z of the case 10, case body 20, and lid member 30 are also referred to as a longitudinal direction, a width direction, and a height direction, respectively.

The lid member 30 closes the opening 21 of the case body 20. In detail, a peripheral edge portion of the lid member 30 is laser-welded over its entire circumference to the ends of the front side part 13, back side part 14, left side part 15, and right side part 16 on the upper side U. At the boundary between the upper end of the case body 20 and the peripheral edge portion of the lid member 30, the case body 20 and the lid member 30 are partially melted by laser and then solidified, forming a melt-solidified portion 18 over the entire circumference.

The lid member 30 is provided with a safety valve 19 at a position slightly to the left side L relative to the center in the right-left direction X. This safety valve 19 will break open when the internal pressure of the case 10 exceeds a valve opening pressure. The lid member 30 is further formed with a liquid inlet 30k, penetrating through the lid member 30 in the upper-lower direction Z, at a position slightly to the right side R relative to the center in the right-left direction X. A sealing member 39 made of aluminum is fitted in the liquid inlet 30*k* from above to hermetically seal the liquid inlet 30*k*.

The lid member 30 is formed with an insertion hole 33*h* for a positive electrode, which will be referred to as a positive-electrode insertion hole 33*h*, penetrating through the lid member 30 in the upper-lower direction Z, near an end on one side (i.e., on the left side L in FIGS. 1 and 2) in the right-left direction X. Further, the lid member 30 is formed with an insertion hole 34*h* for a negative electrode, which will be referred to as a negative-electrode insertion hole 34*h*, penetrating through the lid member 30 in the upper-lower direction Z, near an end on the other side (i.e., the right side R in FIGS. 1 and 2) in the right-left direction X. The positive-electrode insertion hole 33*h* and the negative-electrode insertion hole 34*h* are each formed in a rectangular shape with a long side direction corresponding to the right-left direction X and a short side direction corresponding to the front-back direction Y. In the positive-electrode insertion hole 33*h*, a positive terminal member 50 having an overall vertically-long shape (extended in one direction) is inserted from the upper side U along its longwise direction. In the negative-electrode insertion hole 34*h*, a negative terminal member 60 having an overall vertically-long shape (extended in one direction) is inserted from the upper side U along its longwise direction.

The positive terminal member 50 is fixed to the lid member 30 while being insulated from the lid member 30 via a resin member 70 for a positive electrode, which will be referred to as a positive-electrode resin member 70. Thus, the positive terminal member 50 is supported by the lid member 30 via the positive-electrode resin member 70. In this embodiment, the positive terminal member 50 is made of aluminum. However, the material of the positive terminal member 50 may be appropriately selected from any materials that can be electrically connected to a positive current collecting part 41*r* of the electrode body 40, which will be mentioned later.

The negative terminal member 60 is fixed to the lid member 30 while being insulated from the lid member 30 via a resin member 80 for a negative electrode, which will be referred to as a negative-electrode resin member 80. Thus, the negative terminal member 60 is supported by the lid member 30 via the negative-electrode resin member 80. In this embodiment, the negative terminal member 60 is made of copper. However, the material of the negative terminal member 60 may be appropriately selected from any materials that can be electrically connected to a negative current collecting part 42*r* of the electrode body 40, which will be mentioned later.

The electrode body 40 is a so-called wound electrode body. In this electrode body 40, a strip-shaped positive electrode sheet 41 and a strip-shaped negative electrode sheet 42 are wound together in a predetermined winding direction while alternately interposing strip-shaped separators 43 therebetween. The resultant electrode body 40 has an overall flat shape including side surfaces on the front side F and the back side B, each having a horizontal rectangular shape extending in the upper-lower direction Z and the right-left direction X.

The positive electrode sheet 41 includes a positive current collecting foil (not shown) and a positive active material layer (not shown) formed on this foil. The positive current collecting foil in the embodiment is made of aluminum. However, the material of the positive current collecting foil may be appropriately selected from any materials that can serve the function of the positive electrode of a lithium-ion secondary battery. On the other hand, the negative electrode sheet 42 includes a negative current collecting foil (not shown) and a negative active material layer (not shown) formed on this foil. The negative collecting foil in the embodiment is made of copper. However, the material of the negative current collecting foil may be appropriately selected from any materials that can serve the function of the negative electrode of a lithium-ion secondary battery.

The electrode body 40 includes the positive current collecting part 41*r*, which is an exposed part of the positive current collecting foil. To this positive current collecting part 41*r*, a positive terminal lower part 52 of the positive terminal member 50 is joined. Similarly, the electrode body 40 further includes the negative current collecting part 42*r*, which is an exposed part of the negative current collecting foil. To this negative current collecting part 42*r*, a negative terminal lower part 62 of the negative terminal member 60 is joined. Accordingly, the electrode body 40 is supported by the lid member 30 via the positive terminal member 50 and the negative terminal member 60.

Although detailed illustrations are omitted in the figures, the positive current collecting part 41*r* is a wound part of only the positive current collecting foil protruding in the axial direction of the electrode body 40 from the overlapping negative electrode sheet 42 and separators 43. Similarly, the negative current collecting part 42*r* is a wound part of only the negative current collecting foil protruding in the axial direction of the electrode body 40 from the overlapping positive electrode sheet 41 and separators 43. In this embodiment, the positive current collecting part 41*r* is located at one end of the electrode body 40 on the left side L, while the negative current collecting part 42*r* is located at the other end of the electrode body 40 on the right side R.

Further, the electrode body 40 is placed apart at constant distances from the bottom 12, front side part 13, back side part 14, left side part 15, and right side part 16 of the case body 20, and the lid member 30. Between the electrode body 40 and the case body 20, the insulating holder 5 is located to reliably maintain the insulation therebetween. The shape and the material of the insulating holder 5 may be appropriately selected from any shapes and materials that allow the insulating holder 5 to be placed between the electrode body 40 and the case body 20 and to insulate between them. In this embodiment, the insulating holder 5 is produced from a strip-shaped film made of polypropylene (PP), which is a synthetic resin, and formed in a pouch shape with an opening on the upper side U, in which the electrode body 40 is enclosed. Specifically, the insulating holder 5 insulates the outer surfaces of the electrode body 40 facing the case body 20 from the inner surfaces of the bottom 12, front side part 13, back side part 14, left side part 15, and right side part 16 of the case body 20.

The positive-electrode resin member 70 is made of thermoplastic resin, specifically, polyphenylene sulfide (PPS) in the embodiment. The positive-electrode resin member 70 is joined to each of the lid member 30 and the positive terminal member 50. Since the positive-electrode resin member 70 is joined to the lid member 30 and the positive terminal member 50, these lid member 30, positive terminal member 50, and positive-electrode resin member 70 are integrated as a unit. Thus, the battery 1 including this integrated unit constitutes a metal and resin composite. The positive-electrode resin member 70 hermetically seals while insulating between the lid member 30 and the positive terminal member 50. Specifically, the positive-electrode resin member 70 functions as both a member for insulating and a member for sealing between the lid member 30 and the positive terminal member 50. The material of the positive-electrode resin member 70 may be appropriately selected from any materials that can hermetically seal and insulate between the lid member 30 and the positive terminal member 50 and further can be joined to each of the lid member 30 and the positive terminal member 50 and, for example, may also be another type of thermoplastic resin or different type of resin, such as thermosetting resin.

The negative-electrode resin member 80 is made of thermoplastic resin, specifically, polyphenylene sulfide (PPS) in the embodiment. The negative-electrode resin member 80 is joined to each of the lid member 30 and the negative terminal member 60. Since the negative-electrode resin member 80 is joined to the lid member 30 and the negative terminal member 60, these lid member 30, negative terminal member 60, and negative-electrode resin member 80 are integrated as a unit. Thus, the battery 1 including this integrated unit constitutes a metal and resin composite. The negative-electrode resin member 80 hermetically seals and insulates between the lid member 30 and the negative terminal member 60. Specifically, the negative-electrode resin member 80 functions as a member for insulating and a member for sealing between the lid member 30 and the negative terminal member 60. The material of the negative-electrode resin member 80 may be selected from any materials that can hermetically seal and insulate between the lid member 30 and the negative terminal member 60 and further can be joined to each of the lid member 30 and the negative terminal member 60 and, for example, may also be another type of thermoplastic resin or different type of resin, such as thermosetting resin.

Figure 3:
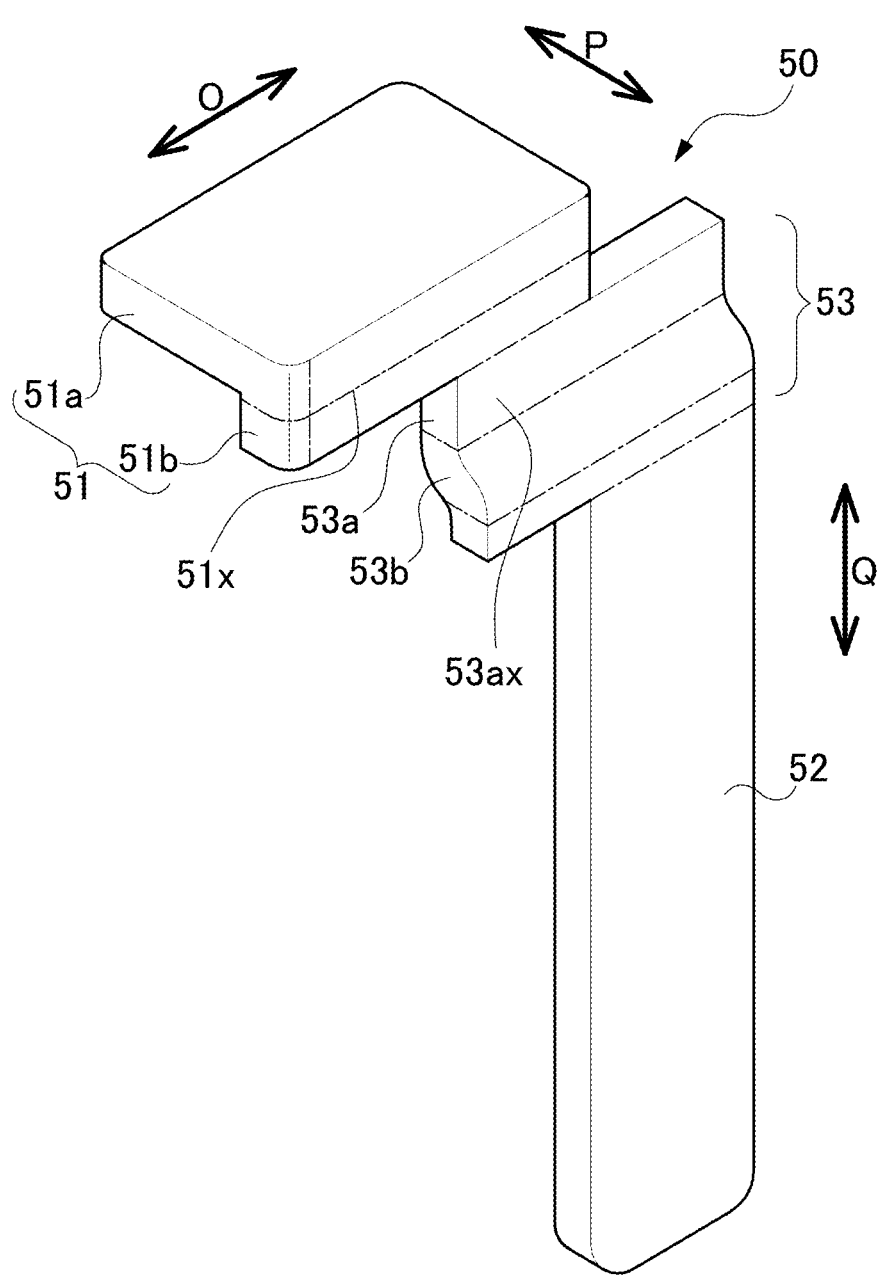
FIG. 3 is a perspective view of a positive terminal member.

Next, the shape of the positive terminal member 50 will be described in detail below. FIG. 3 is a perspective view of the positive terminal member 50. As shown in FIG. 3, the positive terminal member 50 includes a positive terminal upper part 51, a positive terminal lower part 52, and a positive terminal middle part 53. In the battery 1, the positive terminal upper part 51 is located relatively on the upper side U and the positive terminal lower part 52 is located relatively on the lower side D.

The positive terminal upper part 51 has an L-shaped cross-sectional shape constant in one direction. This cross-sectional shape of the upper part 51 is of an L shape with two straight sections, one is longer than the other. Therefore, of the positive terminal upper part 51, a rectangular plate-shaped portion corresponding to the longer straight section of the L-shaped cross-sectional shape is referred to as a long straight portion 51*a*, and a portion vertically extending from one edge of the long straight portion 51*a* is referred to as a short straight portion 51*b*.

In the following description, the positive terminal member 50 is described referring to the reference signs O, P, and Q each representing specific directions for convenience. To be specific, O denotes the direction in which the L-shaped cross-sectional shape of the positive terminal upper part 51 remains constant, P denotes the direction parallel to the straight line of the long straight portion 51*a*, and Q denotes the direction parallel to the straight line of the short straight portion 51*b*. Hereinafter, the reference signs O, P, and Q denoting the specific directions as above will also be referred to as a first direction O, a second direction P, and a third direction Q. Further, for explanation of the positive terminal member 50, one side in the third direction Q where the positive terminal upper part 51 is located may be referred to as an upper side, and the other side in the third direction Q where the positive terminal lower part 52 is located may be referred to as a lower side.

The positive terminal lower part 52 is formed entirely perpendicular to the long straight portion 51*a* and has a rectangular plate shape with a long side direction corresponding to the third direction Q and a short side direction corresponding to the second direction P. In the first direction O, a part of the positive terminal lower part 52 is located within the positive terminal upper part 51, but the rest part protrudes outside the positive terminal upper part 51. In the second direction P, a part of the positive terminal lower part 52 is located within the positive terminal upper part 51, but the rest part protrudes outside the positive terminal upper part 51.

The positive terminal middle part 53 has an overall crank shape that connects the positive terminal upper part 51 and the positive terminal lower part 52. When seen in the second direction P, the positive terminal middle part 53 has a rectangular shape with a long side direction corresponding to the first direction O and a short side direction corresponding to the third direction Q. The length of the positive terminal middle part 53 in the first direction O is longer than the length of the positive terminal lower part 52 in the first direction O. The side surface of the positive terminal lower part 52 at the protruding side from the positive terminal upper part 51 in the first direction O is continuous to, i.e., flush with, the side surface of the positive terminal middle part 53 on the same side.

Both surfaces of the positive terminal middle part 53, located near the short straight portion 51*b* and extending perpendicular to the second direction P, are flush with both surfaces of the short straight portion 51*b* perpendicular to the second direction P. Hereinafter, the portion of the positive terminal middle part 53, formed to be flush with the both surfaces of the short straight portion 51*b* perpendicular to the second direction P, will be referred to as an upper joining portion 53*a*. Further, the side surface 51*x* of the positive terminal upper part 51 including the short straight portion 51*b*, on the side where the positive terminal lower part 52 is located in the second direction P, is flush with the surface 53*ax* of the upper joining portion 53*a* on the same side. On the opposite side of the upper joining portion 53*a* in the third direction Q from the short straight portion 51*b*, a bent portion 53*b* is formed in a crank shape bending outward in the second direction P relative to the positive terminal upper part 51.

In this embodiment, the shape of the negative terminal member 60 is identical to that of the positive terminal member 50. Accordingly, the details of the negative terminal member 60 are not described using a perspective view, but this negative terminal member 60 includes, as with the positive terminal member 50, a negative terminal upper part 61, a negative terminal lower part 62, and a negative terminal middle part 63, which are respectively identical to the positive terminal upper part 51, the positive terminal lower part 52, and the positive terminal middle part 53.

Figure 4:
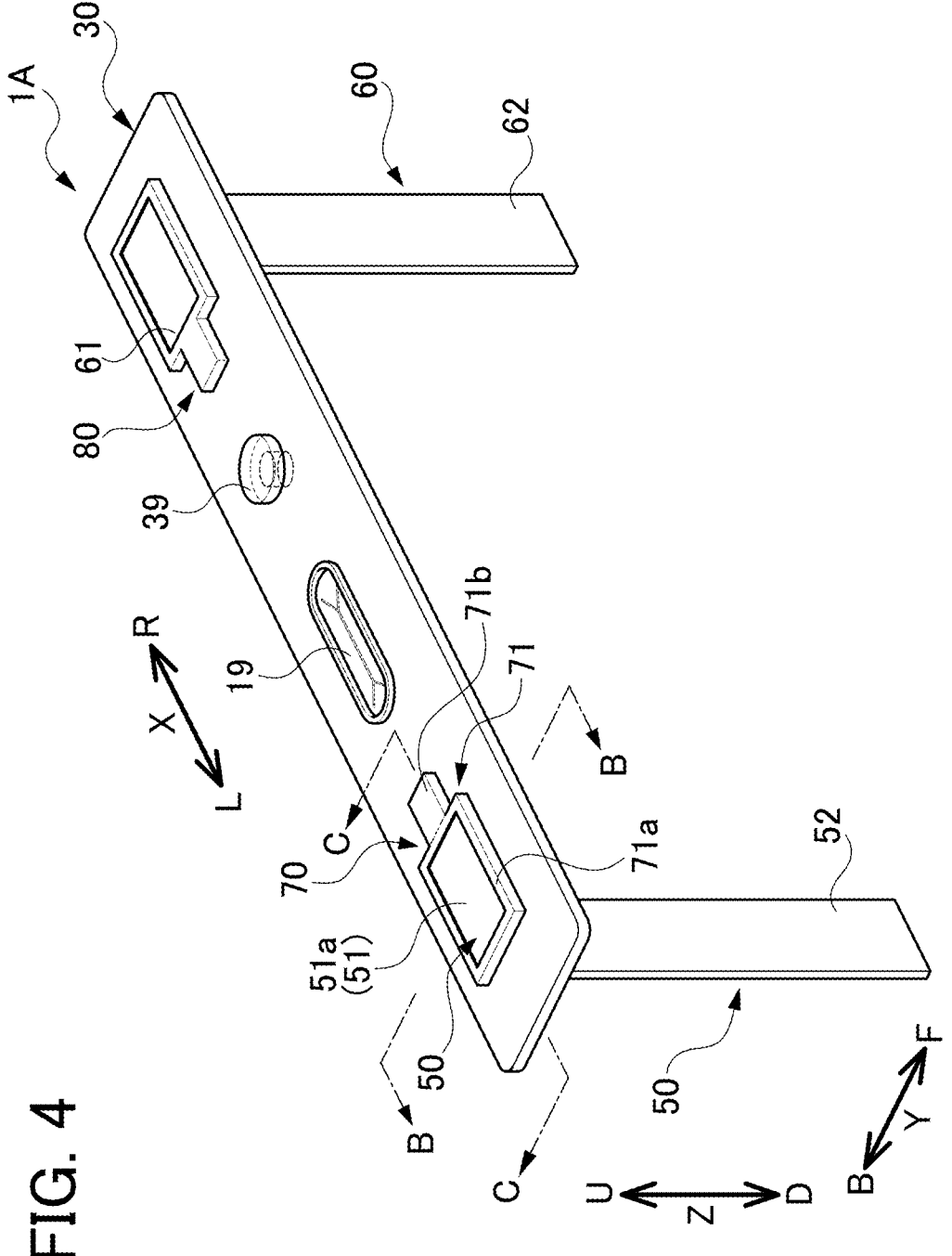
FIG. 4 is a perspective view of a unit member extracted from the battery in FIG. 1.
Figure 5A:
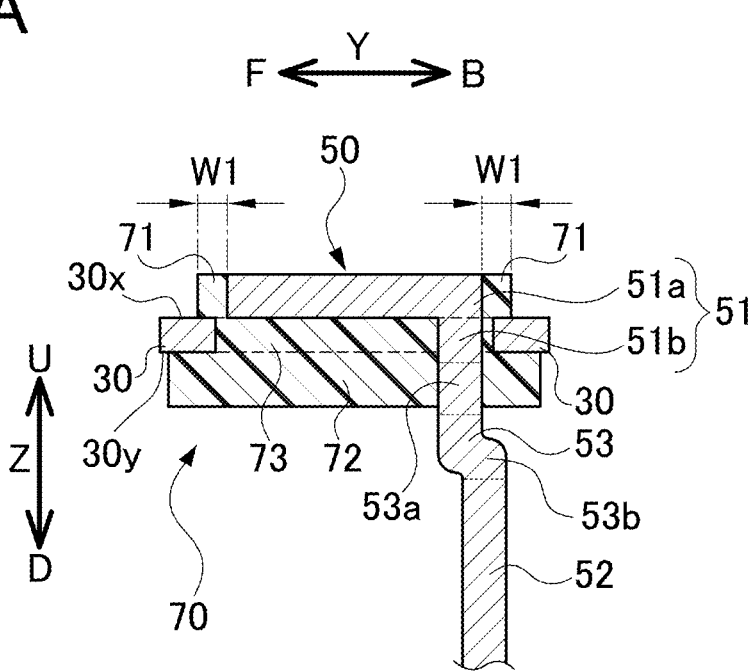
FIG. 5A is a cross-sectional view of the unit member cut along a line B-B in FIG. 4.
Figure 5B:
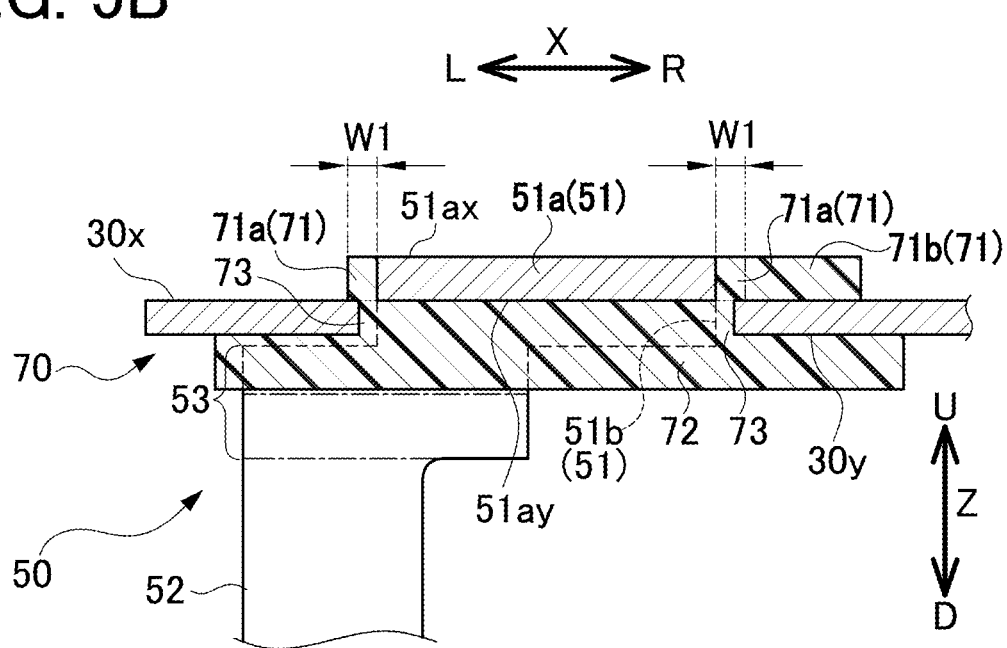
FIG. 5B is a cross-sectional view of the unit member cut along a line C-C in FIG. 4.
Figure 6A:
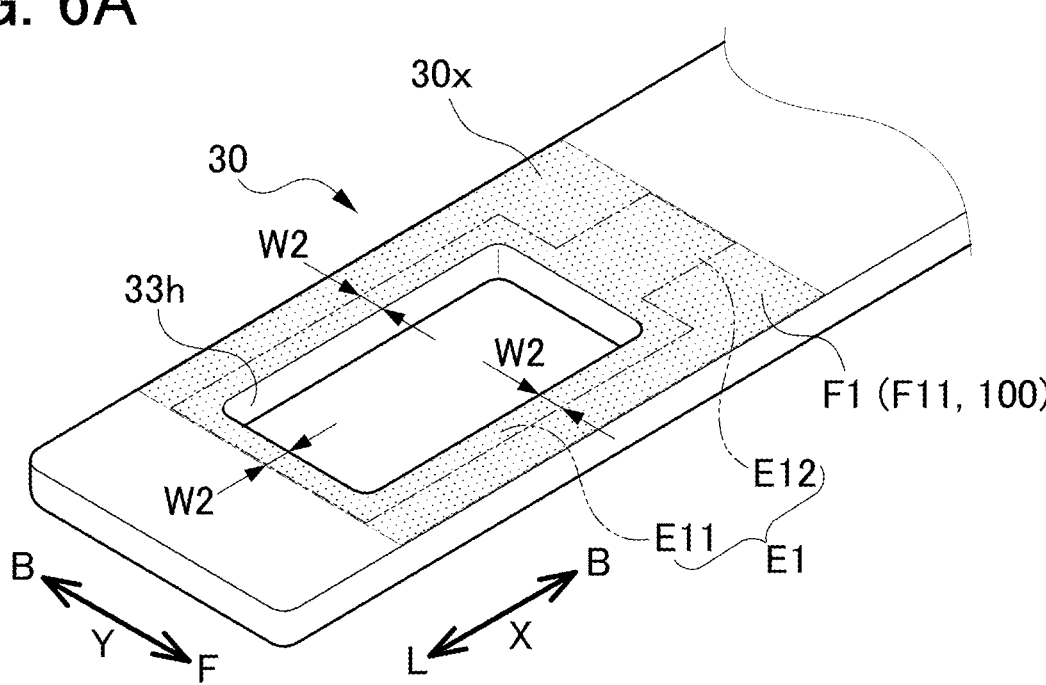
FIG. 6A is an explanatory view showing a joining region of an upper surface of a lid member, joined to a positive-electrode resin member and a roughened region on the upper surface of the lid member.
Figure 6B:
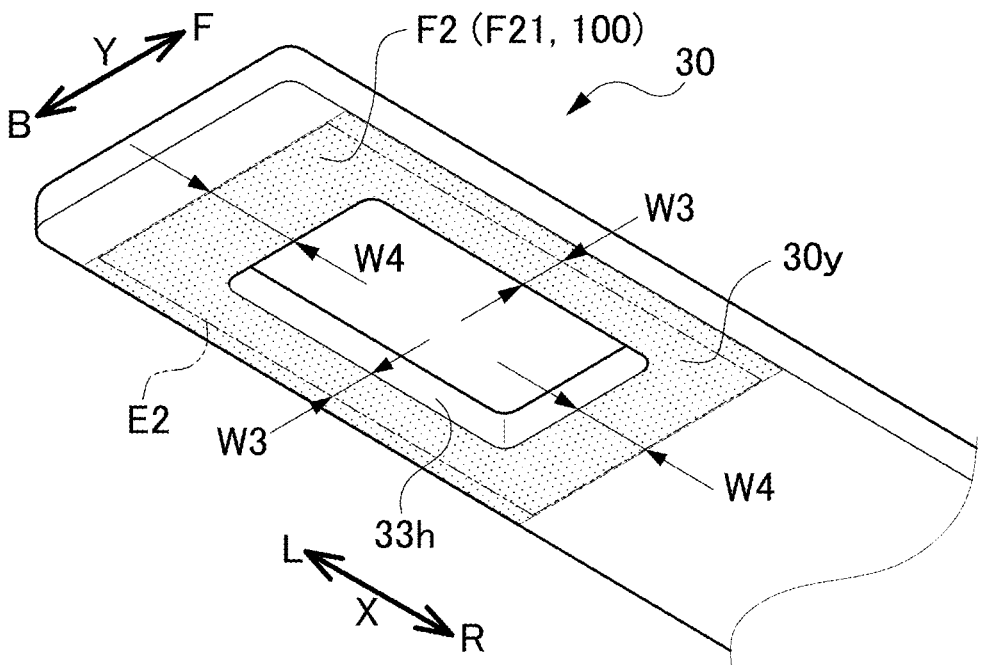
FIG. 6B is an explanatory view showing a joining region of a lower surface of the lid member, joined to the positive-electrode resin member, and a roughened region on the lower surface of the lid member.
Figures 7A, 7B:
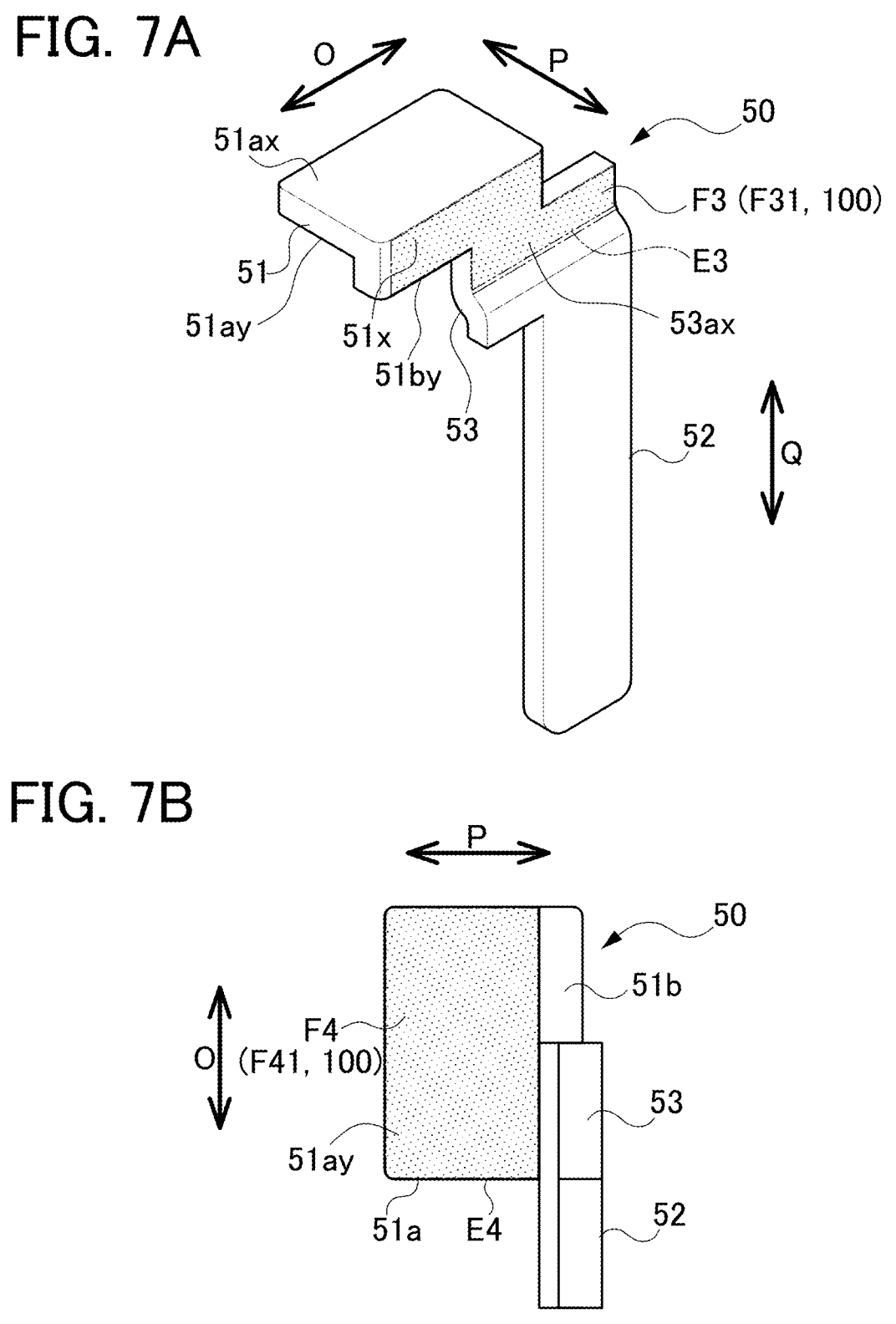

The joining structure of the positive-electrode resin member 70 to the lid member 30 and the positive terminal member 50, and the process of roughening the lid member 30 and the positive terminal member 50 will be described below. FIG. 4 is a perspective view showing a unit member 1A, which is a part of the battery 1 shown in FIGS. 1 and 2, and includes the lid member 30, the positive terminal member 50 and the positive-electrode resin member 70, and the negative terminal member 60 and the negative-electrode resin member 80, which are integrated. FIG. 5A is a cross-sectional view of the unit member 1A cut along a line B-B in FIG. 4 and FIG. 5B is a cross-sectional view of the same cut along a line C-C in FIG. 4. FIGS. 6A and 6B are explanatory diagrams showing the joining regions of the lid member 30 to be joined to the positive-electrode resin member 70 and the roughened regions of the lid member 30 subjected to the roughening process. FIGS. 7A and 7B are explanatory diagrams showing the joining regions of the positive terminal member 50 to be joined to the positive-electrode resin member 70 and the roughened regions of the positive terminal member 50 subjected to the roughening process.

The positive terminal member 50 is fixed to the lid member 30 via the positive-electrode resin member 70 so that the first direction O is parallel to the right-left direction X and the positive terminal lower part 52 is placed on the back side B. On the other hand, the negative terminal member 60 is fixed to the lid member 30 via the negative-electrode resin member 80 so that the first direction O is parallel to the right-left direction X and the negative terminal lower part 62 is placed on the front side F.

The upper surface 51*ax* of the long straight portion 51*a* is exposed on the upper side U. The upper surface 30*x* of the lid member 30 and the lower surface 51*ay* of the long straight portion 51*a* are located on almost the same level in the upper-lower direction Z. Furthermore, the lower surface 51*by* of the short straight portion 51*b* is located slightly below the lower surface 30*y* of the lid member 30 in the upper-lower direction Z. In a plan view, i.e., when viewed from the upper side U toward the lower side D, the long straight portion 51*a* of the positive terminal member 50 inserted in the positive-electrode insertion hole 33*h* is located just inside the positive-electrode insertion hole 33*h*. In the right-left direction X and the front-back direction Y, the long straight portion 51*a* is located at almost the center of the positive-electrode insertion hole 33*h*.

The positive-electrode resin member 70 is formed extending from the upper end of the positive terminal upper part 51 to slightly above the lower end of the upper joining portion 53*a* in the upper-lower direction Z. This positive-electrode resin member 70 hermetically seals the space between the lid member 30 and the positive terminal member 50. In this embodiment, the positive-electrode resin member 70 is integrally formed by insert molding, as described below. For convenience, the portion of this resin member 70 located above the upper surface 30*x* of the lid member 30 is referred to as a positive-resin upper portion 71, the portion of the same located below the lower surface 30*y* of the lid member 30 is referred to as a positive-electrode lower portion 72, and the portion of the same located between the upper surface 30*x* and the lower surface 30*y* of the lid member 30, that is, the portion filling the positive-electrode insertion hole 33*h*, is referred to as a positive-electrode middle portion 73.

The positive-resin upper portion 71 includes a positive-resin upper frame portion 71*a* surrounding all around the long straight portion 51*a* and a positive-resin upper projecting portion 71*b* continuous to the upper frame portion 71*a*.

The positive-resin upper frame portion 71*a* is formed in a rectangular frame shape in plan view. The first width W1 of this upper frame portion 71*a*, from the inner edge to the outer edge, is approximately equal between the straight portions. The positive-resin upper projecting portion 71*b* is formed protruding on the right side R from an almost central part of the straight portion of the upper frame portion 71*a* on the right side R. The upper projecting portion 71*b* has a rectangular plate shape with a long side direction corresponding to the right-left direction X and a short side direction corresponding to the front-back direction Y. The lengths of the upper projecting portion 71*b* in the right-left direction X and in the front-back direction Y are longer than the first width W1. This upper projecting portion 71*b* is formed at a position to which a gate member GT (see FIG. 13) for injection of molten resin is disposed facing during insert molding.

The positive-resin upper frame portion 71*a* is joined to all the outer side surfaces of the long straight portion 51*a* and to a joining region E11 having a rectangular ring shape on the upper surface 30*x* of the lid member 30, which will be referred to as a lid upper-surface frame-shaped joining region E11, surrounding the edge of the positive-electrode insertion hole 33*h* over the entire circumference thereof. The second width W2 of this joining region E11, from the inner edge to the outer edge, is almost equal between the straight portions thereof. The positive-resin upper projecting portion 71*b* is joined, over its entire bottom surface, to the upper surface 30*x* of the lid member 30.

In the following description, the region on the upper surface 30*x* of the lid member 30 joined to the positive-resin upper projecting portion 71*b* is referred to as a lid upper-surface rectangular joining region E12. This joining region E12 is formed protruding on the right side R from almost the center part of the straight portion of the lid upper-surface frame-shaped joining region E11 on the right side R. Thus, the lid upper-surface frame-shaped joining region E11 and the lid upper-surface rectangular joining region E12 are continuous and constitute a joining region on the upper surface 30*x* of the lid member 30 to be joined to the positive-electrode resin member 70. Therefore, those joining regions E11 and E12 are referred together to as a lid upper-surface joining region E1.

The positive-resin lower portion 72 is formed wholly in a rectangular plate shape with a long side direction corresponding to the right-left direction X and a short side direction corresponding to the front-back direction Y. In this lower portion 72, a part of the positive terminal member 50, overlapping with the lower portion 72 in the upper-lower direction Z, is completely embedded. Thus, the lower portion 72 is joined to all the outer side surfaces of the overlapping parts of the short straight portion 51*b* and the upper joining portion 53*a* of the positive terminal member 50 in the upper-lower direction Z.

The positive-resin lower portion 72 is joined to a joining region E2 having a rectangular ring shape on the lower surface 30*y* of the lid member 30, which will be referred to as a lid lower-surface joining region E2, surrounding the edge of the positive-electrode insertion hole 33*h* over the entire circumference. For the distances from the inner edges to the outer edges of the straight portions of the joining region E2, the distances on the front side F and the back side B are almost equal and the distances on the left side L and the right side R are almost equal. Further, the fourth width W4 of this joining region E2, which is the distance from the inner edge to the outer edge of each straight portion on the left side L and the right side R is wider than the third width W3 of the joining region E2, which is the distance from the inner edge to the outer edge of each straight portion on the front side F and the back side B.

The positive-resin middle portion 73 is continuous to both the positive-resin upper portion 71 and the positive-resin lower portion 72. This middle portion 73 is joined to all the inner side surfaces of the positive-electrode insertion hole 33*h* in the lid member 30. Furthermore, in the middle portion 73, a part of the short straight portion 51*b* of the positive terminal member 50, overlapping with the middle portion 73 in the upper-lower direction Z, is completely embedded. Thus, the middle portion 73 is joined to all the outer side surfaces of the overlapping part of the short straight portion 51*b* of the positive terminal member 50 in the upper-lower direction Z.

All the outer side surfaces of the long straight portion 51*a* of the positive terminal member 50 are joined to the positive-resin upper frame portion 71*a*. In the positive terminal member 50, an overlapping part of the short straight portion 51*b* with the positive-resin middle portion 73 and the positive-resin lower portion 72 in the upper-lower direction Z is joined, over its outer side surface, to those middle portion 73 and lower portion 72. Further, in the positive terminal member 50, an overlapping part of the upper joining portion 53*a* with the positive-resin lower portion 72 in the upper-lower direction Z is joined, over its outer side surface, to the lower portion 72. Therefore, in the positive terminal member 50, part of the side surfaces of the positive terminal upper part 51 and the upper joining portion 53*a*, which are continuous and flush with each other, and joined to the positive-electrode resin member 70, is referred to as a terminal side-surface joining region E3 (see FIG. 7A). Further, in the positive terminal member 50 on the side formed with the positive terminal lower part 52 in the third direction Q, a region joined to the positive-electrode resin member 70, that is, the entire lower surface 51*ay* of the long straight portion 51*a*, is referred to as a terminal lower-surface joining region E4 (see FIG. 7B).

As described above, each of the lid member 30 and the positive terminal 50 is provided with multiple joining regions joined to the positive-electrode resin member 70. Specified regions of the lid member 30 and the positive terminal member 50, including the joining regions joined to the resin member 70, have been subjected to a roughening process using a pulse laser in advance. This roughening process will be described below.

The roughening process is performed on the lid member 30, at a lid upper-surface roughened region F1 surrounding and covering the whole lid upper-surface joining region E1 on the upper surface 30*x* and at a lid lower-surface roughened region F2 surrounding and covering the whole lid lower-surface joining region E2 on the lower surface 30*y*. In addition, the roughening process is also performed on the positive terminal member 50, at a terminal side-surface roughened region F3 surrounding and covering the whole lid lower-surface joining region E3 extending over all the side surface of the positive terminal upper part 51 and the side surface of the upper joining portion 53*a*, which are continuous and flush with each other, and at a terminal lower-surface roughened region F4 coinciding with the terminal lower-surface joining region E4.

The method for roughening the lid upper-surface roughened region F1, lid lower-surface roughened region F2, terminal side-surface roughened region F3, and terminal lower-surface roughened region F4 is performed by pulse laser irradiation under the conditions described in detail later. In each of these roughened regions F1 to F4, numerous protrusions 100 are densely arranged overall in a fine mesh-like pattern.

Further, the condition that protrusions arranged in a fine mesh-like arrangement means that protrusions 100 formed by pulse laser irradiation are arranged (densely standing in large number) apart from one another in plan view at distances equal to or less than an average diameter of the protrusions, so that gaps between the protrusions are also continuous two-dimensionally in an almost grid pattern. The shape of a grid defining the almost grid shape is not particularly limited and may include any planar shape, such as a diamond shape, other than a rectangular shape. The almost grid shape may or may not be entirely uniform.

The protrusions 100 in the lid upper-surface roughened region F1 and the lid lower-surface roughened region F2 are formed of debris particles generated on the surfaces of the lid member 30 by pulse laser irradiation and bonding to one another like strings of beads, entirely extending in the height direction. Similarly, the protrusions 100 in the terminal side-surface roughened region F3 and the terminal lower-surface roughened region F4 are formed of debris particles generated on the surfaces of the positive terminal member 50 by pulse laser irradiation and bonding to one another like strings of beads, entirely extending in the height direction.

The debris particles indicate particles with a diameter of 100 nm or less generated by pulse laser irradiation applied to the surface of a metal member, whereby part of the surface is explosively evaporated, the metal vapor or metal atoms react with atmospheric gas to form compounds or the like, which condense and fall on the surface near a pulse-laser irradiated site.

Numerous protrusions 100 in the lid upper-surface roughened region F1 are wholly referred to as a lid upper-surface protrusion layer F11. Similarly, numerous protrusions 100 in the lid lower-surface roughened region F2, the terminal side-surface roughened region F3, and the terminal lower-surface roughened region F4 are referred to as a lid lower-surface protrusion layer F21, a terminal side-surface protrusion layer F31, and a terminal lower-surface protrusion layer F41, respectively.

The numerous protrusions 100 included in each of the protrusion layers F11 to F41 each have a diameter of 5 nm to 20 nm. The overall average value of the diameters of the numerous protrusions 100 included in each protrusion layer F11 to F41 is less than 1 μm on the nano-order. This nano-order size of less than 1 μm means a nanometer (nm) level, i.e., from a few nm to several hundred nm.

One example of the method of calculating the average diameter of the numerous protrusions 100 included in each of the protrusion layer F11 to F41 is the following method. First, a cross-section specimen of joined portions of the lid member 30 and the positive terminal member 50 with the positive-electrode resin member 70 is prepared by a predetermined cross-sectional specimen preparing device (e.g., Cross Section Polisher (registered trademark), manufactured by JEOL Ltd. Second, the cross-section specimen is observed using a Field Emission Scanning Electron Microscope (FE-SEM) to identify the ridge lines of the protrusions 100 of the lid member 30 and the positive terminal member 50 in the cross-section specimen. Finally, based on the identified ridge lines, the average diameter of the numerous protrusions in the cross-section specimen is measured.

The height of each of the numerous protrusions 100 included in each of the protrusion layers F11 to F41 ranges from 10 nm to 1000 nm. Further, the overall average value of heights (the average height) of the numerous protrusions 100 included in each of the protrusion layers F11 to F41 is on the nano-order of less than 1 μm. However, the average height of the numerous protrusions 100 included in each of the protrusion layers F11 to F41 is preferably in a range of 84 nm to 1000 nm.

One example of the method of calculating the average height of the numerous protrusions 100 included in each of the protrusion layers F11 to F41 is as follows. In this calculation method, first, a plate-shaped aluminum member is prepared as a test piece. This test piece of the aluminum member is referred to as a test piece for average height (an average-height test piece). Then, the entire one plane of the average-height test piece is subjected to pulse laser irradiation under the same conditions as in the pulse laser irradiation for of the roughened regions F1 to F4.

Next, a cross-section specimen including a planar portion subjected to the pulse laser irradiation is prepared from the average-height test piece using the predetermined cross-section specimen preparing device (e.g., Cross Section Polisher (registered trademark), manufactured by JEOL Ltd). The cross-section specimen is parallel to the thickness direction of the average-height test piece. Successively, A cross-sectional image of the cross-section specimen using a scanning electron microscope (JEM ARM 200F Dual-X: JEOL Ltd.). The magnification of this cross-sectional image is 150000×.

Then, the area of each cross-section (the cross-sectional area) and the base end line length of the protrusions in the cross-sectional image are measured using the image processing software "ImageJ". The average height of the protrusions is calculated by the following formula:

Average height (nm) of the protrusions=Cross-sectional area (nm²)÷Base end line length (nm) of the protrusions.

Figure 8:
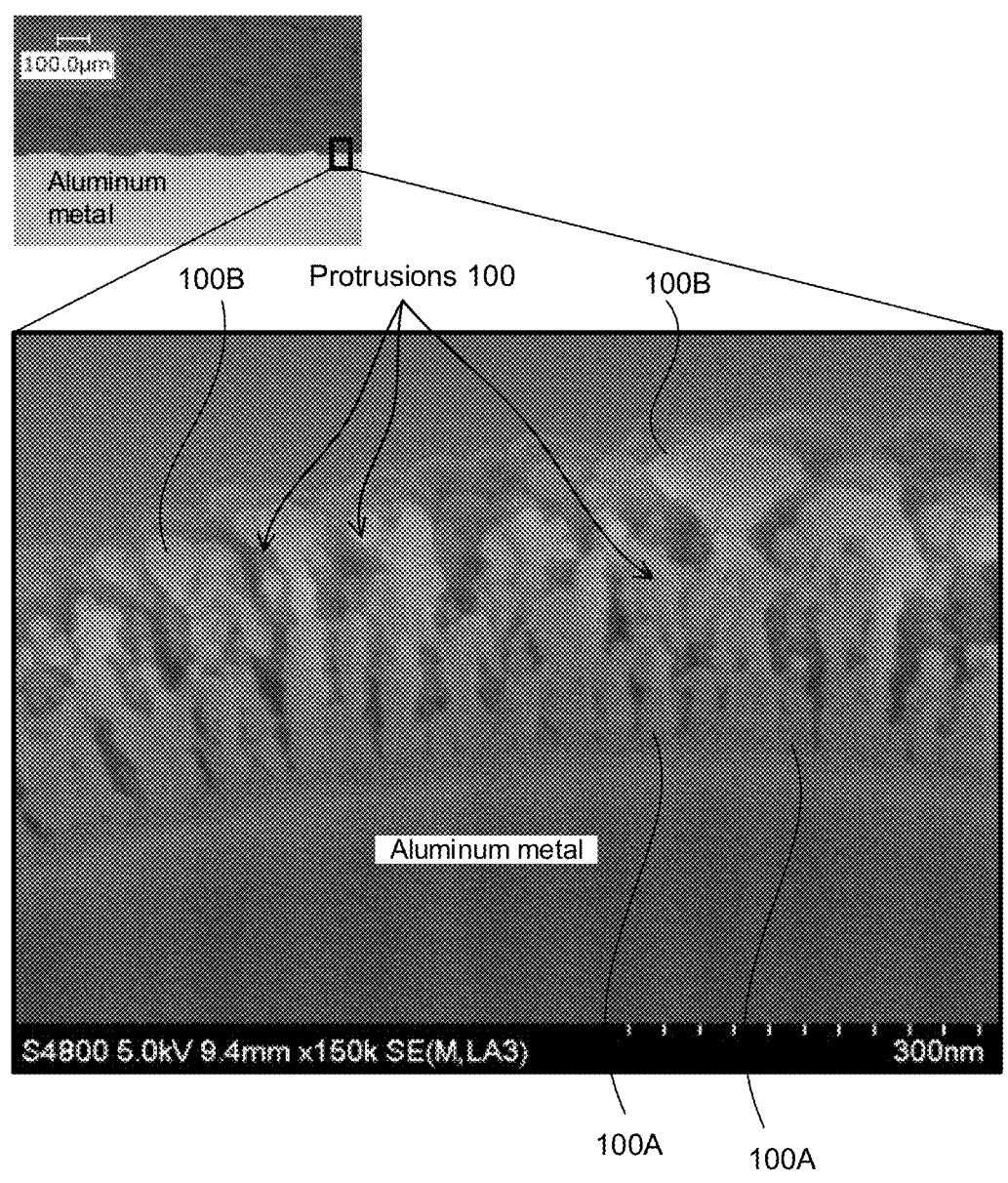
FIG. 8 is an image showing a state of a surface of an aluminum member that is actually irradiated with a pulse laser under the same conditions as pulse laser irradiation for a roughened region, so that numerous protrusions are arranged densely in a fine mesh-like pattern on the surface of the member on the nano-order level.

Herein, FIG. 8 shows an image showing a state of the surface of an aluminum member, which will be also referred to as a member surface, that is actually irradiated with a pulse laser under the same conditions as the pulse laser irradiation for the roughened regions F1 to F4, so that numerous protrusions of nano-order level are densely, or compactly, arranged in a fine mesh-like pattern on the member surface. As shown in FIG. 8, numerous protrusions with diameters and heights on the nano-order level are arranged densely in a fine mesh-like manner. The scale at the right lower corner on the lower image of FIG. 8 is marked in 30 nm increments.

Each of the protrusion layers F11 to F41 includes, as a whole, metal aluminum, amorphous alumina, and α-alumina. Furthermore, at least the proximal end portions 100A of the protrusions 100 in the protrusion layers F11 to F41, i.e., the range of 20 nm from the proximal end portion 100A (the root portion) of each protrusion 100, contains amorphous alumina and α-alumina.

The presence of metal aluminum, amorphous alumina, and α-alumina in the protrusions 100 was confirmed by elemental mappings. Specifically, a cross-section specimen was first prepared by the FIB (Focused Ion Beam) method from the surface of an aluminum member having been irradiated with a pulse laser under the same conditions as the pulse laser irradiation for the roughened regions F1 to F4. The cross-section specimen includes boundaries between the aluminum member and the numerous protrusions. Next, a magnified projection image and the analysis results of a chemical state, using Transmission Electron Microscopy-Electron Energy Loss Spectroscopy (TEM-EELS).

Figures 9A, 9B, 9C, 9D:
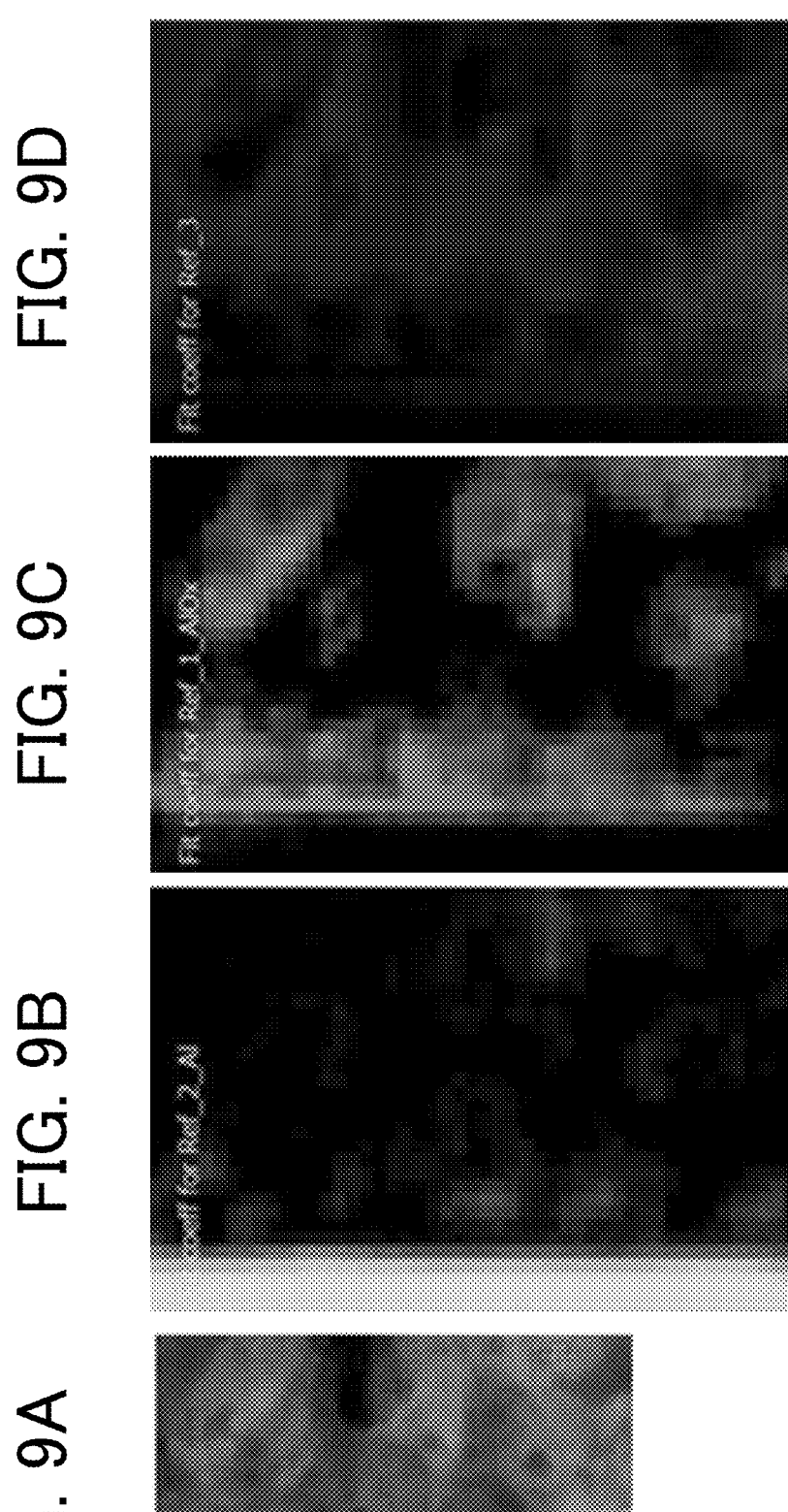
FIG. 9A is a magnified projection image of a cross-section specimen obtained by TEM-EELS.
FIG. 9B is a mapping image (a chemical state analysis result) showing a chemical state A.
FIG. 9C is a mapping image (a chemical state analysis result) showing a chemical state B.
FIG. 9D is a mapping image (a chemical state analysis result) showing a chemical state C.

FIG. 9A shows a magnified projection image of the cross-section specimen obtained by the TEM-EELS. FIGS. 9B, 9C, and 9D show mapping images of the chemical states included in the cross-section specimen obtained by the TEM-EELS. In detail, FIG. 9B is a mapping image (a chemical state analysis result) showing a chemical state A, FIG. 9C is a mapping image (a chemical state analysis result) showing a chemical state B, and FIG. 9D is a mapping image (a chemical state analysis result) showing a chemical state C.

Figures 10A, 10B:
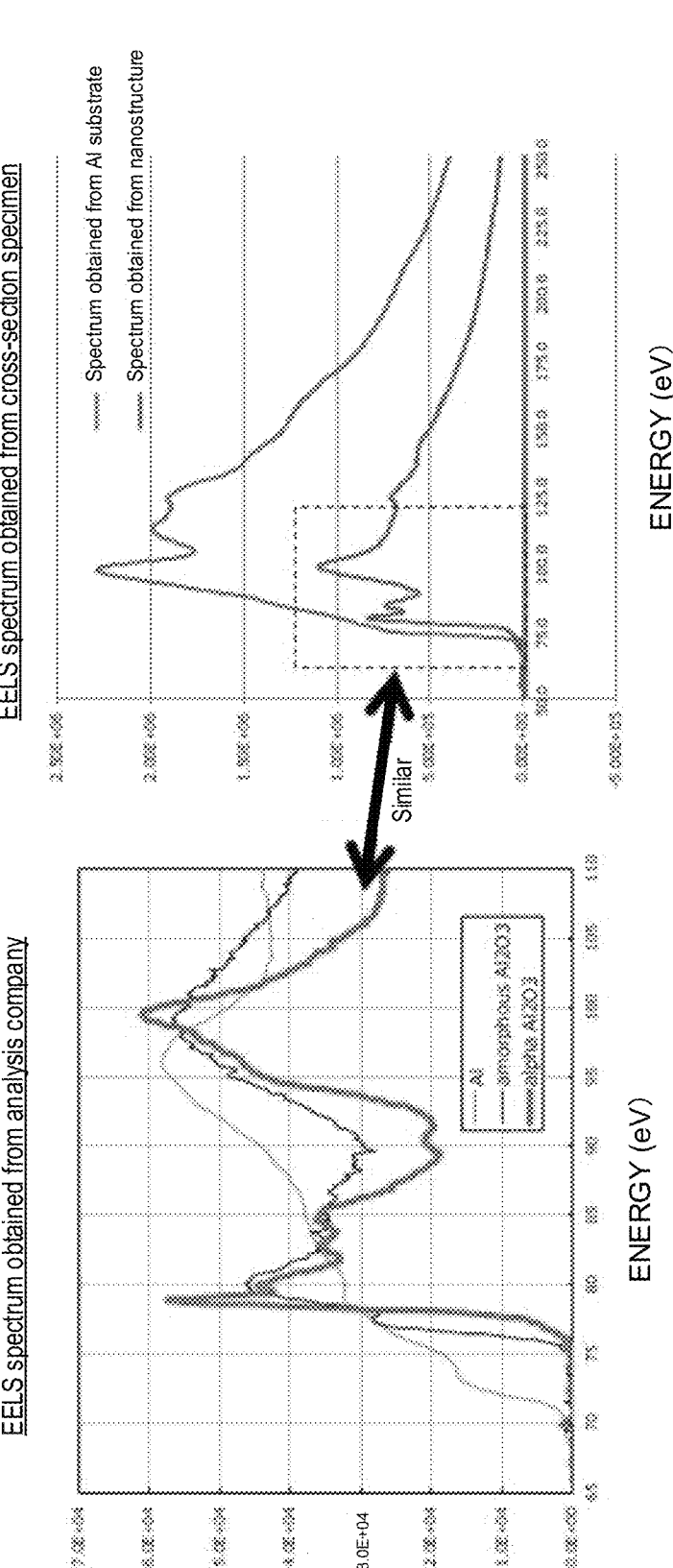
FIG. 10A is a graph showing EELS spectra of Al-related compounds obtained from an analysis company.
FIG. 10B is a graph showing EELS spectra obtained from a cross-section specimen used at this time.

It is considered that the chemical state A is metal aluminum, the chemical state B is α-alumina, and the chemical state C is amorphous alumina. This is based on the comparison between the EELS spectra of Al-related compounds obtained in the past from an analysis company, Toray Research Centre Inc., and the EELS spectra obtained from the current cross-section specimen. For reference, each spectrum is plotted in FIGS. 10A and 10B.

The following matters are presumed from FIGS. 9B to 9D.

(1) The protrusions 100 entirely contain both metal aluminum and aluminum oxide (amorphous alumina and α-alumina).

(2) The proximal end portions 100A of the protrusions 100 contain both amorphous alumina and α-alumina. In other words, their relationship is expressed as:

Area of α-alumina/Area of amorphous alumina>0.01.

(3) In the proximal end portions 100A of the protrusions 100 (the range of 20 nm from each root portion), the area of α-alumina is larger than the area of amorphous alumina, that is, α-alumina is contained more than amorphous alumina.

(4) The proximal end portions 100A of the protrusions 100 contain a small amount of metal aluminum, compared to amorphous alumina and α-alumina, as expressed by:

Area of aluminum oxide (amorphous alumina+α-alumina)/Area of metal aluminum+Area of aluminum oxide>90%.

The resin (polyphenylene sulfide) constituting the positive-electrode resin member 70 is impregnated to the proximal end portions 100A (root portions) of the protrusions 100. In other words, the positive-electrode resin member 70 is joined to the lid member 30 and the positive terminal member 50 at the proximal end portions 100A (root portions) of the protrusions 100. Joining of the positive-electrode resin member 70 to the lid member 30 and the positive terminal member 50 at the proximal end portions 100A (root portions) of the protrusions 100 represents that the positive-electrode resin member 70 is also joined to the lid member 30 and the positive terminal member 50 at the distal end portions 100B of the protrusions 100.

The structure of joining the negative-electrode resin member 80 to the lid member 30 and the negative terminal member 60 is also configured as with the structure of joining the positive-electrode resin member 70 to the lid member 30 and the positive terminal member 50 described above referring to FIGS. 5A, 5B, 6A, 6B, 7A, and 7B. Further, the process of roughening the joined regions of the lid member 30 with the negative-electrode resin member 80 and the joined regions of the negative terminal member 60 with the negative-electrode resin member 80 are also configured as with the roughening process on the lid member 30 and the positive terminal member 50 described above referring to FIGS. 5A to 7B.

Production of Battery

Figure 11:
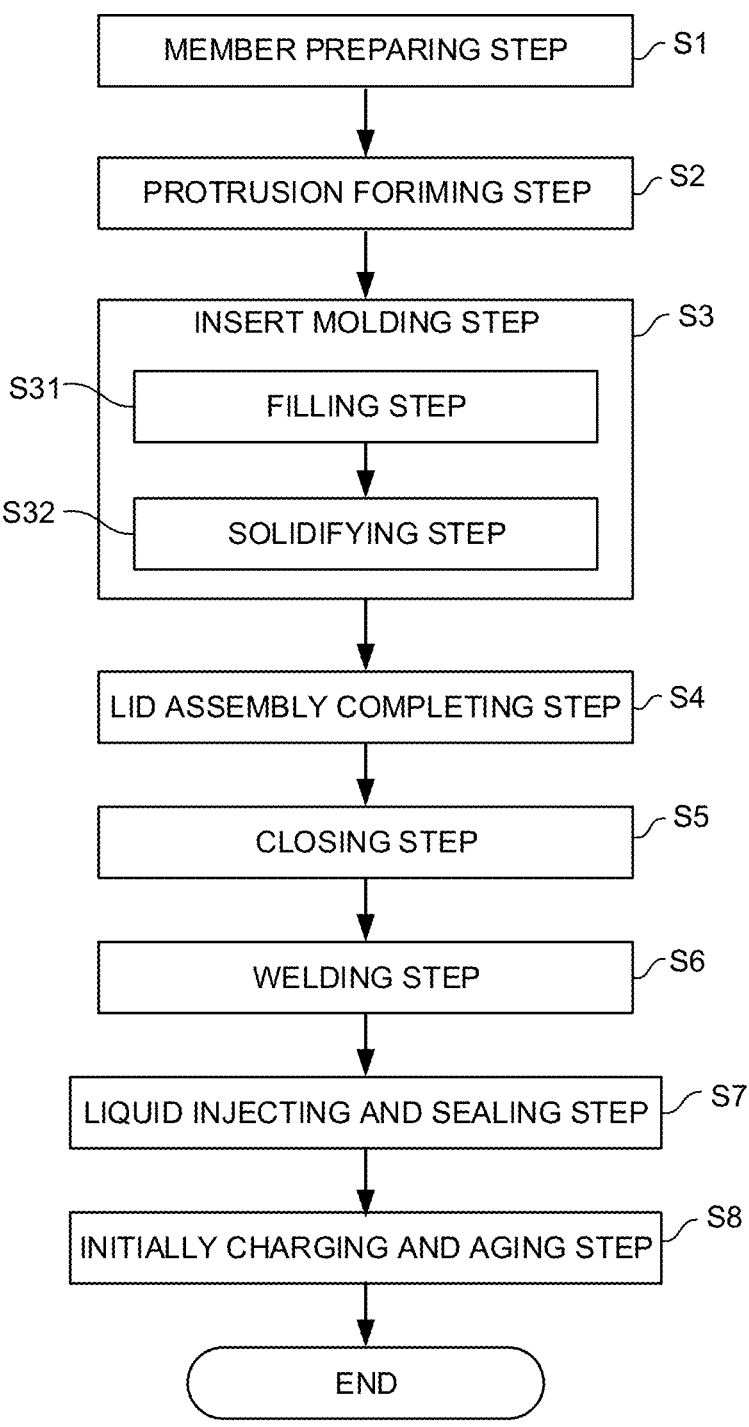
FIG. 11 is a flowchart of a method for producing the battery in the embodiment.

A method for producing the battery 1 will be described below referring to a flowchart of FIG. 11. This producing method for the battery 1 includes a component preparing step S1, a protrusion forming step S2, an insert-molding step S3, a lid assembly completing step S4, a closing step S5, a welding step S6, a liquid injecting and sealing step S7, and an initially charging and aging step S8.

In the component preparing step S1, the lid member 30, the positive terminal member 50, and the negative terminal member 60 are prepared. Specifically, the lid member 30 is made from an aluminum plate formed with the liquid inlet 30k, the positive-electrode insertion hole 33h, the negative-electrode insertion hole 34*h*, and the safety valve 19 by use of a conventional general machining method. The positive terminal member 50 is made from an aluminum plate into the shape shown in FIG. 3 by use of a conventional general machining method. Further, the negative terminal member 60 is made from a copper plate into the same shape as the positive terminal member 50 by use of the conventional general machining method.

Following the component preparing step S1, the protrusion forming step S2 is performed. In this protrusion forming step S2, the surfaces of the lid member 30, which are not formed yet with protrusions and can form the lid upper-surface roughened region F1 and the lid lower-surface roughened region F2, are irradiated with a pulse laser to form the lid upper-surface roughened region F1 and the lid lower-surface roughened region F2. Similarly, in the protrusion forming step S2, the surfaces of the positive terminal member 50, which are not formed yet with protrusions and can form the terminal side-surface roughened region F3 and the terminal lower-surface roughened region F4, are irradiated with a pulse laser, to form the terminal side-surface roughened region F3 and the terminal lower-surface roughened region F4.

Figure 12A:
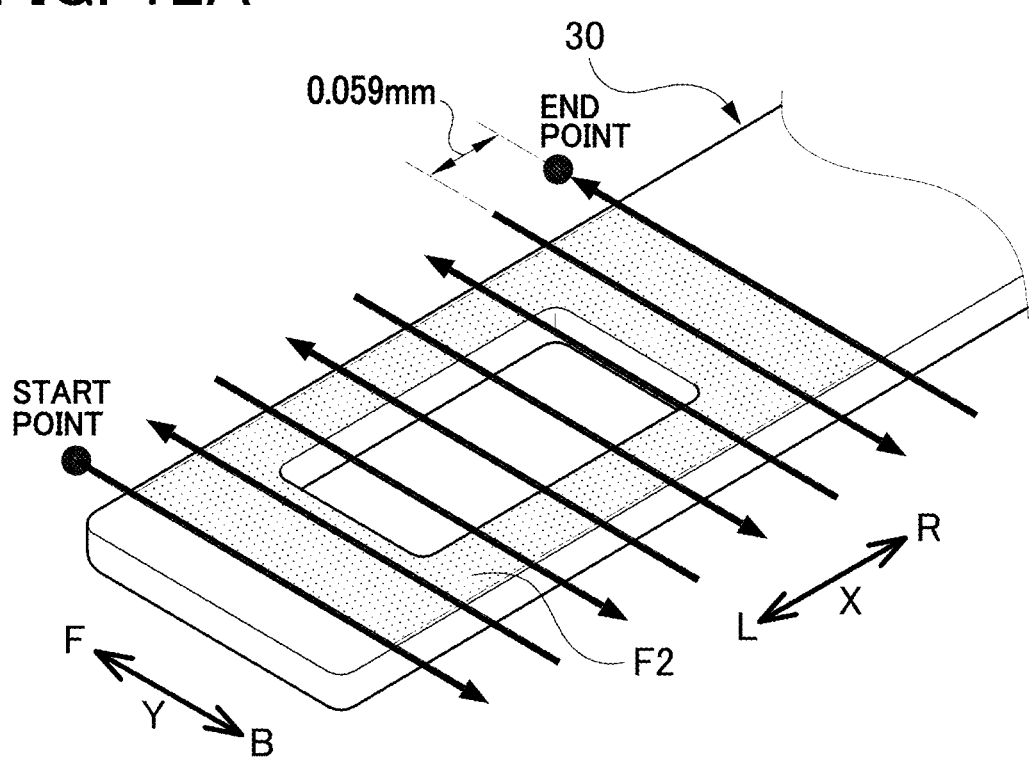
FIG. 12A is a schematic diagram showing a roughening process on a lid lower-surface roughened region.
Figure 12B:
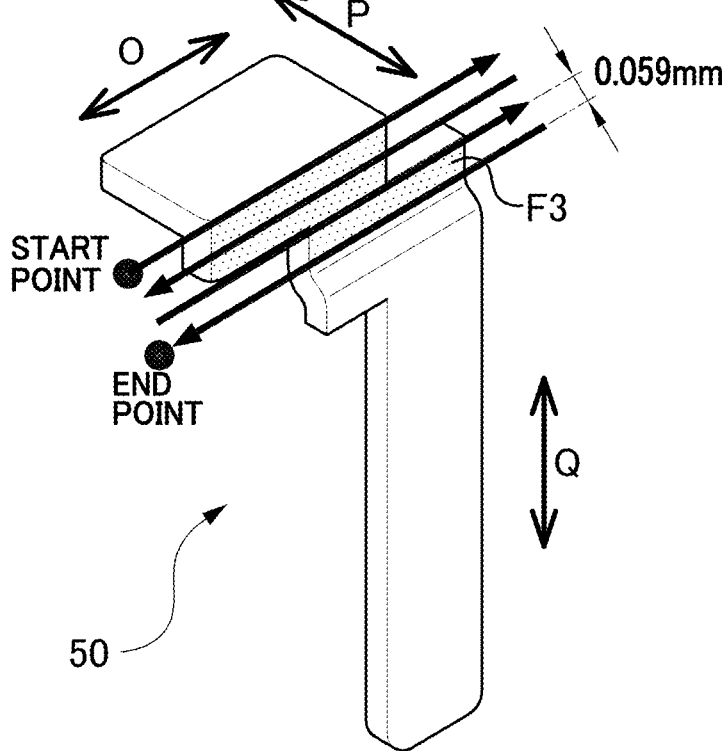
FIG. 12B is a schematic diagram showing a roughening process on a terminal side-surface roughened region.

One example of various conditions of the pulse laser irradiation in the protrusion forming step S2 is as below. The energy density of one pulse of laser irradiation is set to 24 $J/cm^2$ for aluminum and 32 $J/cm^2$ for copper. For example, other laser irradiation conditions for aluminum are set such that a wavelength is 1060 nm, an average output power is 25 W, a pulse period is 40 µs, a pulse width is 50 ns, a spot diameter is 63 µm, a moving speed of a laser beam is 1450 mm/s, and a line pitch is 0.059 mm. FIGS. 12A and 12B are schematic diagram showing the trajectory of a laser beam during the pulse laser irradiation performed on the lid lower-surface roughened region F2 and the terminal side-surface roughened region F3 in the protrusion forming step S2.

As shown in FIG. 12A, the lid lower-surface roughened region F2 is irradiated with a pulse laser beam that is advanced from one end of the region F2 on one side (the left side in FIG. 12A) in the right-left direction X, which is the side indicated by "START POINT" in FIG. 12A, to one side in the front-back direction Y (the back side B in FIG. 12A). Successively, the pulse laser beam is shifted toward the other side in the right-left direction X (the right side R in FIG. 12A) by a set line pitch (0.059 mm) and is advanced again to irradiate the region F2 toward the other side in the front-back direction Y (the front side F in FIG. 12A). Further, the pulse laser beam is shifted toward the other side in the right-left direction X (the right side R in FIG. 12A) by the set line pitch (0.059 mm) and is advanced again to irradiate the region F2 toward the one side in the front-back direction Y (the back side B in FIG. 12A). Thereafter, this pulse laser irradiation is repeatedly performed by advancing the laser beam to one side or the other side in the front-back direction Y until reaching an end of the region F2 on the other side (the right side R in FIG. 12A) in the right-left direction X, which is the side indicated by "END POINT" in FIG. 12A.

When the lid lower-surface roughened region F2 is subjected as above to the pulse laser irradiation under the above-described conditions, the surfaces of the lid member 30 made of metal aluminum are formed with protrusions 100 that contain metal aluminum, amorphous alumina, and α-alumina and are densely, or compactly, arranged in a finely meshed pattern with the nano-order diameter and height.

The starting position of the pulse laser irradiation on the lid lower-surface roughened region F2 is not limited to on the side marked with START POINT in FIG. 12A, but may be on the side marked with END POINT in FIG. 12A. The pulse laser irradiation on the lid upper-surface roughened region F1 is also performed in the same manner as the pulse laser irradiation on the lid lower-surface roughened region F2 as illustrated in FIG. 12A. However, the laser irradiation for the lid upper-surface roughened region F1 and the laser irradiation for the lid lower-surface roughened region F2 may be performed in different manners.

As shown in FIG. 12B, the terminal side-surface roughened region F3 is irradiated with a pulse laser beam that is advanced from one end of the region F3 on one side in the third direction Q of the positive terminal member 50, which is the side indicated by "START POINT" in FIG. 12B, to one side of the positive terminal member 50 in the first direction O. Successively, the pulse laser beam is shifted toward the other side of the positive terminal member 50 in the third direction Q by a set line pitch (0.059 mm) and is advanced again to irradiate the region F3 toward the other side in the first direction O. Then, the pulse laser beam is further shifted toward the other side of the positive terminal member 50 in the third direction Q by the set line pitch (0.059 mm) and is advanced again to irradiate the region F3 toward the one side in the first direction O. Thereafter, this pulse laser irradiation is repeatedly performed by advancing the laser beam to one side or the other side in the first direction O until reaching an end of the region F3 on the other side in the third direction Q, which is the side indicated by "END POINT" in FIG. 12B.

When the terminal side-surface roughened region F3 is subjected as above to the pulse laser irradiation, the surfaces of the positive terminal member 50 made of metal aluminum are formed with protrusions 100 that contain metal aluminum, amorphous alumina, and α-alumina and are densely arranged in a finely meshed pattern with the nano-order diameter and height.

The starting position of the pulse laser irradiation on the terminal side-surface roughened region F3 is not limited to on the side marked with START POINT in FIG. 12B, but may be on the side marked with END POINT in FIG. 12B. The pulse laser irradiation on the terminal lower-surface roughened region F4 is also performed in the same manner as the pulse laser irradiation on the terminal side-surface roughened region F3 as illustrated in FIG. 12B. In this case, however, the advancing direction of the pulse laser beam is the same as that for the terminal side-surface roughened region F3, but the starting position and the ending position of the pulse laser irradiation are respectively set to an end on one side and an end on the other side of the terminal lower-surface roughened region F4 in the first direction O of the positive terminal member 50. Furthermore, the pulse laser beam is shifted by a set line pitch (0.059 mm) toward one side or the other side in the second direction P.

In the protrusion forming step S2, additionally, the pulse laser irradiation is performed on the joining region of the lid member 30 around the negative-electrode insertion hole 34*h* to the negative-electrode resin member 80 in almost the same manners as for the lid upper-surface roughened region F1 and the lid lower-surface roughened region F2, excepting the energy density. Similarly, the pulse laser irradiation is performed on the joining region of the negative terminal member 60 to the negative-electrode resin member 80 in almost the same manners as for the terminal side-surface roughened region F3 and terminal lower-surface roughened region F4, excepting the energy density. The above term, "almost the same manners", represents the regions to be subjected to pulse laser irradiation and the pulse laser irradiation conditions.

Figure 13:
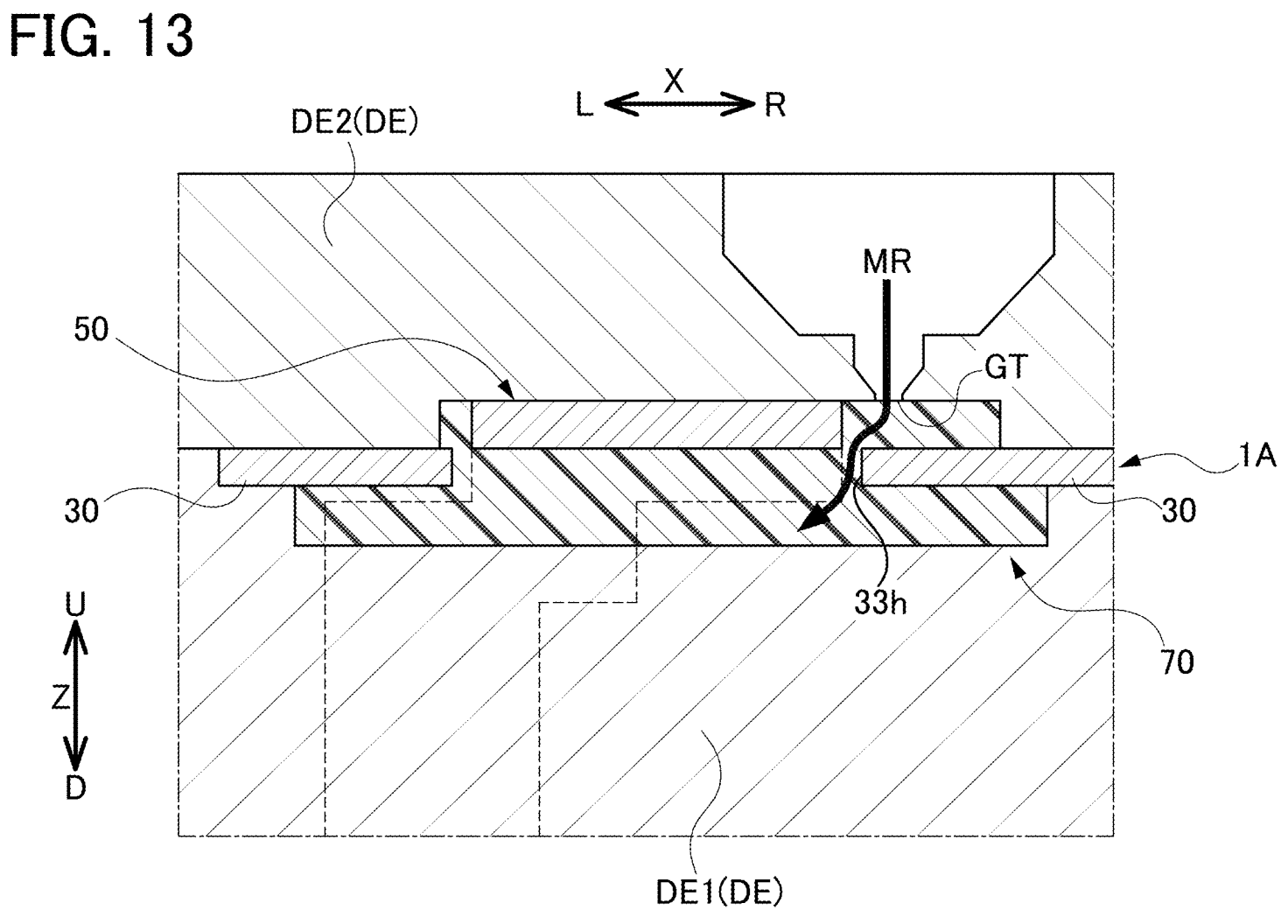

After the protrusion forming step S2, the insert molding step S3 is performed. In the insert molding step S3, the positive-electrode resin member 70 and the negative-electrode resin member 80 are formed, so that the positive-electrode resin member 70 is integrally joined to the lid member 30 and the positive terminal member 50 and the negative-electrode resin member 80 is integrally joined to the lid member 30 and the negative terminal member 60. That is, the unit member 1A, which is an aluminum-resin composite, is produced. FIG. 13 is an explanatory diagram schematically showing the insert molding step S3 for the positive terminal member 50.

In the insert molding step S3, a mold DE is used, including a lower mold DE1 placed on the lower side and an upper mold DE2 placed on the upper side. These lower mold DE1 and upper mold DE2 are set in place first, and then the lid member 30, the positive terminal member 50, and the negative terminal member 60 are put in respective predetermined positions. At that time, the positive terminal member 50 inserted in the positive-electrode insertion hole 33$h$, the negative terminal member 60 inserted in the negative-electrode insertion hole 34$h$, and the lid member 30 are integrally supported by the mold DE. Further, the lower mold DE1 and the upper mold DE2 set in place to form the space, or cavity, corresponding to each of the positive-electrode resin member 70 and the negative-electrode resin member 80.

In the insert molding step S3, specifically, a filling step S31 is performed first and then a solidifying step S32 is performed. In the filling step S31, as shown in FIG. 13, molten resin MR, which will form the positive-electrode resin member 70 and the negative-electrode resin member 80, is injected from a gate member GT into the cavity formed by the lower mold DE1 and the upper mold DE2 through the upper mold DE2. At that time, for example, the molten resin MR is injected to fill in the gaps between numerous protrusions 100 until reaching the root portions of the protrusions 100.

The materials of the positive-electrode resin member 70 and the negative-electrode resin member 80 are primarily composed of polyphenylene sulfide. Further, the materials of the positive-electrode resin member 70 and the negative-electrode resin member 80 contain glass fillers. The linear expansion coefficient of the materials of the positive-electrode resin member 70 and the negative-electrode resin member 80 are set to a value between the linear expansion coefficient of copper (1.65) and the linear expansion coefficient of aluminum (2.31).

After injection of the molten resin MR, the solidifying step S32 is performed by appropriately cooling the molten resin MR to form the positive-electrode resin member 70 and the negative-electrode resin member 80. In detail, for example, the molten resin MR is injected into the gaps between the numerous protrusions 100 included in the roughened regions F1 to F4 until the molten resin MR reaches the root portions of the protrusions 100 in the filling step S31 is solidified, forming the positive-electrode resin member 70 joined to the joining regions E1 to E4 respectively including the roughened regions F1 to F4. Similarly, the negative-electrode resin member 80 is also formed. Subsequently, the upper mold DE2 is moved upward, and the unit member 1A integrally composed of the lid member 30, the positive-electrode resin member 70 and the positive terminal member 50, and the negative-electrode resin member 80 and the negative terminal member 60 is taken out from the lower mold DE1.

After the insert molding step S3, the lid assembly completing step S4 is performed to complete the lid assembly. Specifically, the electrode body 40 is prepared, and the positive terminal lower part 52 and the negative terminal lower part 62 of the unit member 1A produced in the insert molding step S3 are respectively connected by welding to the positive current collecting part 41$r$ and the negative current collecting part 42$r$ of the electrode body 40. The electrode body 40 in this state is then enclosed with the pouched-shaped insulating holder 5. Accordingly, the lid assembly consisting of the lid member 30, positive terminal member 50, negative terminal member 60, positive-electrode resin member 70, negative-electrode resin member 80, electrode body 40, and insulating holder 5 is completed.

Following the lid assembly completing step S4, the closing step S5 is performed. In this closing step S5, the case body 20 is prepared, and a lower part of the lid assembly completed in the lid assembly completing step S4, located under the lid member 30, including the electrode body 40 and the insulating holder 5, is inserted in the case body 20, and then the opening 21 of the case body 20 is closed with the lid member 30.

After the closing step S5, the welding step S6 is performed. In this welding step S6, each end portion of the front side part 13, back side part 14, left side part 15, and right side part 16 of the case body 20, on the upper side U in the upper-lower direction Z, is laser welded to the peripheral edge portion of the lid member 30 over the entire circumference to hermetically seal the opening 21.

After the welding step S6, the liquid injecting and sealing step S7 is performed, in which the electrolyte 3 is injected, or poured, into the case 10 through the liquid inlet 30$k$, so that the electrode body 40 is impregnated with the electrolyte 3. Then, the sealing member 39 is fitted into the liquid inlet 30$k$ from above and welded to the lid member 30 over the entire circumference to hermetically seal between sealing member 39 and the lid member 30.

Following the liquid injecting and sealing step S7, the initial charging and aging step S8 is performed, in which the battery 1 is connected to a charging device (not shown) and initially charged. This initially charged battery 1 is then left to stand for a predetermined time to age. Thus, the battery 1 is completed.

Next, the experiment to verify the acid resistance and the hydrofluoric acid resistance of the joined portions of an aluminum member and a resin member will be described below. This experiment was carried out by the applicants. This experiment is referred to as a verification experiment for durability of joined portions, i.e., a joined-portion durability verification experiment. This verification experiment includes three steps (1) to (3) listed below:

(1) Production of test pieces to be tested;

(2) Implementation of an acid resistance test; and (3) Implementation of a hydrofluoric acid resistance test.

The production of test pieces (1) is first described below. The test pieces are substances to be subjected to the joined-portion durability verification experiment. The test pieces are each formed of a composite consisting of a plate-shaped aluminum member and a resin member joined together. The resin member is made of polyphenylene sulfide (PPS). The plate-shaped aluminum member is made of metal aluminum. As the plate-shaped aluminum member, there are aluminum members whose member surfaces have been irradiated with a pulse laser under the irradiation conditions as in the protrusion forming step S2 and aluminum members whose member surfaces have not been irradiated with a pulse laser.

Hereinafter, the aluminum members that have been pulse-laser irradiated are referred to as "irradiated aluminum members" and the aluminum members that have not been pulse-laser irradiated are referred to as "unirradiated aluminum members". In the joined-portion durability verification experiment, three irradiated aluminum members and three unirradiated aluminum members are prepared for the acid resistance test, and three irradiated aluminum members and three unirradiated aluminum members are prepared for the hydrofluoric acid resistance test.

Each of the aluminum members is formed in an overall square shape in plan view. The length of each side of this square is 50 mm. The thickness of the metal member is 0.5 mm.

On the surface of each of the irradiated aluminum members, which is to be joined to a resin member, a roughened region is formed by pulse-laser irradiation under the irradiation conditions as in the protrusion forming step S2. The roughened region has a circular shape with a diameter of 20 mm. The center of this roughened region is almost coincident with the center of the irradiated aluminum member. In the roughened region, as in the foregoing roughened regions F1 to F4, numerous protrusions 100 with nano-order diameter and height are formed in a densely fine mesh-like arrangement.

Each of the aluminum members is joined to a resin member by insert molding. The resin member has a circular disk shape. This resin member has a diameter of 16 mm and a height of 3 mm. The center of the resin member is almost coincident with the center of the aluminum member. In this experiment, further, the resin member is joined to the irradiated aluminum member within the roughened region.

Next, the acid resistance test (2) is described below. In this acid resistance test, each of the irradiated aluminum members and the unirradiated aluminum members was immersed in 0.1 mol/L of hydrochloric acid solution. Then, after 1, 5, and 24 hours from the start of immersion, the irradiated aluminum members and the unirradiated aluminum members were taken out one by one. For each immersion time, after a lapse of 1 hour from take-out, it was checked whether or not the resin members has separated, i.e., come unstuck, from the aluminum members.

Finally, the hydrofluoric acid resistance test (3) is described below. In this hydrofluoric acid resistance test, the irradiated aluminum members and the unirradiated aluminum members were each immersed first in an electrolyte solution composed as EC/DEC=1:1, containing 1M LiPF$_6$, and added with 1200 ppm of water. Then, after 1, 5, and 24 hours from the start of immersion, the irradiated aluminum members and the unirradiated aluminum members were taken out one by one. For each immersion time, after a lapse of 1 hour from take-out, it was checked whether or not the resin members has separated, i.e., come unstuck, from the aluminum members.

FIG. 14A is a table showing results of the acid resistance test (2) and FIG. 14B is a table showing results of the hydrofluoric acid resistance test (3). These tables in FIGS. 14A and 14B show the relationship on each aluminum member between the elapsed times from when the aluminum members were taken out and the presence/absence of separation of the resin members from the aluminum members.

As shown in FIG. 14A, as the results of the acid resistance test (2), no separation was observed in each of the irradiated aluminum members, but a separation was observed in the unirradiated aluminum member taken out after immersion of 24 hours. Further, as shown in FIG. 14B, as the results of the hydrofluoric acid resistance test (3), no separation was observed in each of the irradiated aluminum members, but a separation was observed in the unirradiated aluminum member taken out after immersion of 24 hours. It is therefore considered that the acid resistance and the hydrofluoric acid resistance of the portions of the aluminum members joined to the resin members are higher for the irradiated aluminum members than for the unirradiated aluminum members. Each of the irradiated aluminum members was also elementally mapped using the above-described FIB method and TEM-EELS, even though the details thereof are omitted herein. As a result, it was confirmed that α-alumina was also present in every irradiated aluminum member. Further, the unirradiated aluminum members, whose member surfaces have been formed with oxide film, are considered to contain no α-alumina. This result reveals that the configuration with the protrusions containing α-alumina has higher acid resistance and higher hydrofluoric acid resistance at the portions joined to the resin members than the configuration with the protrusions containing no α-alumina.

As described above, a large number of nano-order protrusions 100 each having a diameter of less than 1 μm and a height of less than 1 μm are densely arranged on each of the member surfaces of the lid member 30 and the positive terminal member 50, each made of metal aluminum, so that the anchor effect improves the joining strength of the joined portions of the positive-electrode resin member 70 joined to the lid member 30 and the positive terminal member 50. Moreover, the proximal end portion 100A of each protrusion 100, continuous to the member surface, contains not only amorphous alumina but also α-alumina that is excellent in chemical stability. This configuration improves the acid resistance and the hydrofluoric acid resistance of the joined portions, so that the positive-electrode resin member 70 is less likely to separate when it is immersed in a non-aqueous electrolyte solution, which contains hydrochloric acid and lithium hexafluorophosphate and is added with water. In addition, the proximal end portions 100A of the numerous protrusions 100 contain α-alumina more than amorphous alumina. Thus, the positive-electrode resin member 70 is even less likely to separate even when it is immersed in the non-aqueous electrolyte solution, which contains hydrochloric acid and lithium hexafluorophosphate and is added with water.

Since the positive-electrode resin member 70 fills the gaps between the numerous protrusions 100 formed in the roughened regions F1 to F4, the joining strength of the joined portions of the aluminum member and the resin member is improved as an aluminum-resin composite, and the positive-electrode resin member 70 is even less likely to separate even when immersed in a non-aqueous electrolyte solution, which contains hydrochloric acid and lithium hexafluorophosphate and is added with water.

Moreover, the protrusions 100 containing α-alumina and having the nano-order diameter and the nano-order height are formed densely in a fine-mesh-like arrangement in the protrusion forming step S2 as described above, and the positive-electrode resin member 70 fills the gaps between the numerous protrusions 100 in the insert molding step S3 as described above. This configuration further improves the joining strength of the joined portions of the positive-electrode resin member 70 joined to the lid member 30 and the positive terminal member 50 and also improves the acid resistance and the hydrofluoric acid resistance of the joined portions, so that the positive-electrode resin member 70 is even less likely to separate when immersed in a non-aqueous electrolyte solution, which contains hydrochloric acid and lithium hexafluorophosphate and is added with water.

The foregoing embodiments are mere examples and give no limitation to the disclosure. Accordingly, the disclosure may be embodied in other specific forms without departing from the essential characteristics thereof. Several examples of modifications and variations of this embodiment will be described below.

The aforementioned embodiment exemplifies the flat wound electrode body 40 as an electrode body housed in the case 10, but alternatively may adopt a laminated electrode body. In the foregoing embodiment, a single electrode body is housed in the case 10, but a plurality of electrode bodies may be accommodated together in the case 10.

In the above-described embodiment, the case 10 has an overall flat and bottomed rectangular parallelepiped shape, but the shape of this case 10 may be changed appropriately to another shape such as a columnar shape. Moreover, one or both of the positive terminal member 50 and the negative terminal member 60 may be changed appropriately to any other shapes. Similarly, one or both of the positive-electrode resin member 70 and the negative-electrode resin member 80 may be changed appropriately to any other shapes. The positive terminal member 50 and the negative terminal member 60 in the above-described embodiment have the same shape, but may have different shapes. Similarly, the positive-electrode resin member 70 and the negative-electrode resin member 80 in the above-described embodiment have the same shape, but may have different shapes.

In the above-described embodiment, the battery 1, in which the lid member 30 and the positive terminal member 50, each made of metal aluminum, are respectively joined to the positive-electrode resin member 70, is included in the aluminum-resin composite of the disclosure. However, the unit member 1A constituting the battery 1 is also included in the aluminum-resin composite of the disclosure.

In the foregoing embodiment, the disclosure is applied to the lithium-ion secondary battery. However, the disclosure is applicable to any general power storage devices, for example, nickel-metal hydride batteries and nickel-cadmium batteries. The application of the disclosure is not limited to batteries, but is widely applicable to any composites in which a metal member and a resin member are joined to each other.

In the above-described embodiment, as the irradiation condition of the pulse laser irradiation in the protrusion forming step S2, that is, the pulse laser irradiation conditions for forming protrusions containing metal aluminum, amorphous alumina, and α-alumina and each having a nano-order diameter and a nano-order height, in a densely mesh-like arrangement, the wavelength is set to 1060 nm, but it may be changed appropriately in a range of 1060 nm to 1080 nm. Similarly, the spot diameter may be set appropriately in a range of 10 μm to 200 μm. More preferably, the spot diameter may be set appropriately in a range of 50 μm to 200 μm. Furthermore, the spacing, or distance, between centers of beam spots in laser irradiation may be set to + or −10% of the spot diameter.

According to FIGS. 9C and 9D, in the proximal end portions of the protrusions (a range of 20 nm from respective root portions), the area of α-alumina is wider than the area of amorphous alumina. In other words, it is assumed that α-alumina is contained more than amorphous alumina. However, the percentage of amorphous alumina and the percentage of α-alumina, contained in the proximal end portions of the protrusions, may be approximately equal to each other. Alternatively, amorphous alumina may be contained more than α-alumina. However, in terms of the acid resistance and the hydrofluoric acid resistance, it is preferable that α-alumina is contained more than amorphous alumina.

In the above-described embodiment, the positive-electrode resin member 70 reaches the proximal end portions (the root portions) of the numerous protrusions constituting the roughened regions F1 to F4. However, for example, the positive-electrode resin member 70 may fill in the gaps between the numerous protrusions so that the positive-electrode resin member 70 wholly reaches the distal end portions of the protrusions, the portions between the distal end portions and the middle portions, and the portions between the nearly middle portions or the middle portions and the proximal end portions.

In the above-described embodiment, the roughened regions F1 and F2 are formed over the entire joining regions E1 and E2, respectively, but the roughened regions F1 and F2 may be formed on part of the joining region E1 and part of the joining region E2, respectively. In this case, however, the roughened regions F1 and F2 are each preferably formed in a ring-shape surrounding the positive-electrode insertion hole 33h in the joining regions E1 and E2. Further, the roughened regions F3 and F4 are formed over the entire joining regions E3 and E4, respectively, but the roughened regions F3 and F4 may be formed on part of the joining region E3 and part of the joining region E4, respectively. In this case, however, it is preferable that the roughened region F3 is formed on the entire positive terminal middle part 53 in the joining region E3. Further, the roughened region F4 is preferably formed in a ring shape along the peripheral edge of the joining region E4.

REFERENCE SIGNS LIST

1 Battery
10 Case
20 Case body
30 Lid member
33h Positive-electrode insertion hole
34h Negative-electrode insertion hole
50 Positive terminal member
60 Negative terminal member
70 Positive-electrode resin member
80 Negative-electrode resin member
E1 Lid upper-surface joining region
E2 Lid lower-surface joining region
E3 Terminal side-surface joining region
E4 Terminal lower-surface joining region
F1 Lid upper-surface roughened region
F2 Lid lower-surface roughened region
F3 Terminal side-surface roughened region
F4 Terminal lower-surface roughened region

What is claimed is:

1. A battery, comprising:
an aluminum-resin composite composed of:
an aluminum member made of metal aluminum, having a member surface on which protrusions are densely arranged, the protrusions each having a nano-order diameter of less than 1 μm and a nano-order height of less than 1 μm, wherein
each protrusion of the protrusions includes a proximal end portion continuous to the member surface, the proximal end portion having a height of 20 nm from a root portion of said each protrusion and containing amorphous alumina and α-alumina, and the proximal end portion of each protrusion of the protrusions contains a higher mass ratio of $\alpha$-alumina to amorphous alumina than in a region more than 20 nm from the root portion of said each protrusion; and a resin member joined to the aluminum member; and a non-aqueous electrolyte containing lithium hexafluorophosphate.

2. The battery according to claim 1, wherein an average height of the protrusions is in a range of 84 nm to 1000 nm.

3. A method of producing a battery, the battery comprising:

an aluminum-resin composite composed of:

an aluminum member made of metal aluminum, having a member surface on which protrusions are densely arranged, a resin member joined to the aluminum member; and a non-aqueous electrolyte containing lithium hexafluorophosphate, the method comprising:

forming the protrusions on the member surface by laser irradiation to the member surface to be formed with protrusions, the protrusions each having a nano-order diameter of less than 1 $\mu$m and a nano-order height of less than 1 $\mu$m, wherein each protrusion of the protrusions includes a proximal end portion continuous to the member surface, the proximal end portion has a height of 20 nm from a root portion of said each protrusion and contains amorphous alumina and $\alpha$-alumina, and the proximal end portion of each protrusion contains a higher mass ratio of $\alpha$-alumina to amorphous alumina than in a region more than 20 nm from the root portion of said each protrusion; and after forming the protrusions, forming the resin member on the member surface by insert molding.

4. The method according to claim 3, wherein an average height of the protrusions is in a range of 84 nm to 1000 nm.

* * * * *